(12) United States Patent
Okubo

(10) Patent No.: US 6,823,708 B1
(45) Date of Patent: Nov. 30, 2004

(54) SHEET METAL BENDING SYSTEM PROVIDED WITH A PRESS BRAKE AND A SHEET METAL SUPPORT DEVICE AND A METHOD TO PREPARE ITS CONTROL DATA AND A COMPUTER READABLE STORAGE MEDIUM THAT STORES ITS CONTROL DATA

(75) Inventor: Takanori Okubo, Kanagawa (JP)

(73) Assignee: Amada Company Limited, Kanagawa (JP)

( * ) Notice: Subject to any disclaimer, the term of this patent is extended or adjusted under 35 U.S.C. 154(b) by 0 days.

(21) Appl. No.: 10/030,622

(22) PCT Filed: Jul. 13, 2000

(86) PCT No.: PCT/JP00/04703

§ 371 (c)(1),
(2), (4) Date: Jan. 11, 2002

(87) PCT Pub. No.: WO01/03864

PCT Pub. Date: Jan. 18, 2001

(30) Foreign Application Priority Data

Jul. 13, 1999 (JP) ............................................ 11-199185

(51) Int. Cl.$^7$ ................................................ B21J 13/10
(52) U.S. Cl. ........................... 72/420; 72/14.8; 72/15.3; 72/31.11; 700/114; 700/116; 700/165
(58) Field of Search ................................ 72/14.8, 15.1, 72/15.3, 16.2, 17.3, 20.1, 20.2, 20.3, 31.1, 31.11, 31.12, 419, 420, 421; 700/114, 115, 116, 165

(56) References Cited

U.S. PATENT DOCUMENTS 4,753,100 A * 6/1988 Hanni .......................... 72/419

(List continued on next page.)

FOREIGN PATENT DOCUMENTS

| JP | 63-61094 | 6/1982 |
| JP | 3-24313 | 3/1991 |
| JP | 6-335728 | 12/1994 |
| JP | 8-187515 | 7/1996 |

OTHER PUBLICATIONS

English Language Abstract of JP 6–335728.

(List continued on next page.)

Primary Examiner—Ed Tolan
(74) Attorney, Agent, or Firm—Greenblum & Bernstein, P.L.C.

(57) ABSTRACT

A computer readable recording medium which stores control data to control the action of a sheet metal bending system which is provided with a press brake and a sheet metal support device, where the press brake is provided with a punch and die which bends the sheet metal along the bending line by approaching to and parting from each other, and a back gauge to determine the position of the sheet metal against the punch and die, the sheet metal support apparatus is provided with a support arm which supports the sheet metal and may be rotated freely centered on the rotation axis which is parallel to the bending axis, the control data is a control data to control the bending process which includes a plurality of bending processes to produce sheet metal parts (parts) with a plurality of bending lines by the press brake and sheet metal support device by controlling the approach and parting motion of the punch and die and at least the rotational motion of the support arm, and the control data is related to the sheet metal parts ID, and the process number which specifies the ith bending process of the plurality of processes which is related to this ID and related to the process number, the D value which prescribes the target engagement position of the punch and die in the ith bending process and related to the process number, the L value which prescribes the target position of the back gauge in the ith bending process, and related to the process number, the V width of the die to be used in the ith bending process.

13 Claims, 20 Drawing Sheets

(a)

| SHEET METAL PARTS ID | | | | | | | | | |
|---|---|---|---|---|---|---|---|---|---|
| BENDING PROCESS DATA | | | | | | | | | |
| PROCESS (BENDING ORDER) | D VALUE | L VALUE | D VALUE REVISED VALUE α | L VALUE REVISED VALUE β | PULL BACK VALUE (PB) | CONTACT POSITION (y, z) | PUNCH | DIE | V WIDTH |
| 1 | d1 | l1 | α1 | β1 | PB$_1$ | y1, z1 | P1 | D1 | V1 |
| 2 | d2 | l2 | α2 | β2 | PB$_2$ | y2, z2 | P2 | D2 | V2 |
| 3 | d3 | l3 | α3 | β3 | PB$_3$ | y3, z3 | P3 | D3 | V3 |
| 4 | d4 | l4 | α4 | β4 | PB$_4$ | y4, z4 | P4 | D4 | V4 |
| 5 | d5 | l5 | α5 | β5 | PB$_5$ | y5, z5 | P5 | D5 | V5 |

(b)

| SHEET METAL PARTS ID | | | | | | | | |
|---|---|---|---|---|---|---|---|---|
| FOLLOW-UP DATA | | | | | | | | |
| PROCESS (BENDING ORDER) | SHEET METAL SUPPORT DEVICE NECESSARY OR NOT | NUMBER OF SUPPORT ARMS | SUPPORT ARM TARGET ROTATION POSITION | SUPPORT ARM TARGET HEIGHT POSITION | INTERFERENCE EVASION (DISENGAGEMENT) MOVEMENT PATTERN | DISENGAGEMENT POSITION (RISE AMOUNT) DISENGAGEMENT ANGLE (ANGLE) | FOLLOW-UP ANGLE REVISED VALUE | FOLLOW-UP START HEIGHT |
| 1 | NECESSARY /NO | 2 | Θ1 | H1 | PATTERN 1 | — | θ1 | h1 |
| 2 | NECESSARY /NO | 2 | Θ2 | H2 | PATTERN 3 | S2 | θ2 | h2 |
| 3 | NECESSARY /NO | 1 | Θ3 | H3 | PATTERN 2 | S3, σ3 | θ3 | h3 |
| 4 | NECESSARY /NO | 2 | Θ4 | H4 | PATTERN 3 | S4 | θ4 | h4 |
| 5 | NECESSARY /NO | 1 | Θ5 | H5 | PATTERN 2 | S5, σ5 | θ5 | h5 |

U.S. PATENT DOCUMENTS 5,812,406 A * 9/1998 Matsumoto et al. .......... 72/20.1
5,857,366 A * 1/1999 Koyama ...................... 72/31.1
5,983,688 A * 11/1999 Anzai et al. ................... 72/15.1
6,246,919 B1 * 6/2001 Hassel ......................... 700/116
6,256,547 B1 * 7/2001 Tognon ........................ 700/97

OTHER PUBLICATIONS

English Language Abstract of JP 8–187515.

English Language Abstract of JP 3–24313.

* cited by examiner

FIG.5
(a)
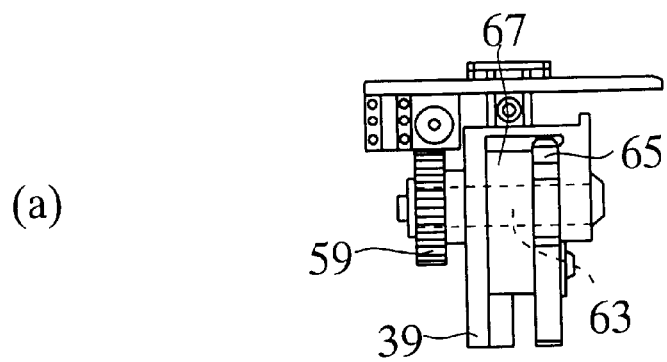
(b)
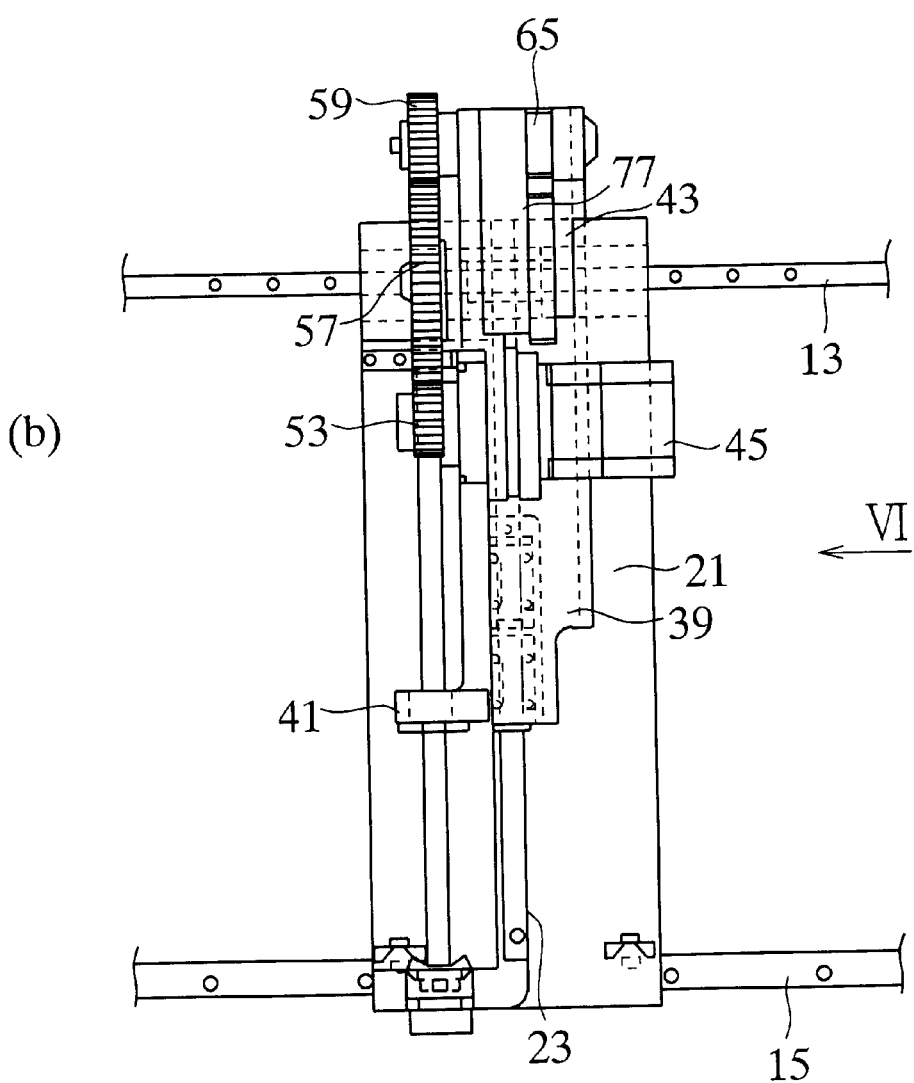

[SHEET METAL PARTS ID]

BENDING PROCESS DATA

| PROCESS (BENDING ORDER) | D VALUE | L VALUE | D VALUE REVISED VALUE $\alpha$ | L VALUE REVISED VALUE $\beta$ | PULL BACK VALUE (PB) | CONTACT POSITION (y, z) | PUNCH | DIE | V WIDTH |
|---|---|---|---|---|---|---|---|---|---|
| 1 | d1 | l1 | $\alpha 1$ | $\beta 1$ | PB$_1$ | y1, z1 | P1 | D1 | V1 |
| 2 | d2 | l2 | $\alpha 2$ | $\beta 2$ | PB$_2$ | y2, z2 | P2 | D2 | V2 |
| 3 | d3 | l3 | $\alpha 3$ | $\beta 3$ | PB$_3$ | y3, z3 | P3 | D3 | V3 |
| 4 | d4 | l4 | $\alpha 4$ | $\beta 4$ | PB$_4$ | y4, z4 | P4 | D4 | V4 |
| 5 | d5 | l5 | $\alpha 5$ | $\beta 5$ | PB$_5$ | y5, z5 | P5 | D5 | V5 |

(b)

[SHEET METAL PARTS ID]

FOLLOW-UP DATA

| PROCESS (BENDING ORDER) | SHEET METAL SUPPORT DEVICE NECESSARY OR NOT | NUMBER OF SUPPORT ARMS | SUPPORT ARM TARGET ROTATION POSITION | SUPPORT ARM TARGET HEIGHT POSITION | INTERFERENCE EVASION (DISENGAGEMENT) MOVEMENT PATTERN | DISENGAGEMENT POSITION (RISE AMOUNT) DISENGAGEMENT ANGLE (ANGLE) | FOLLOW-UP ANGLE REVISED VALUE | FOLLOW-UP START HEIGHT |
|---|---|---|---|---|---|---|---|---|
| 1 | NECESSARY /NO | 2 | $\Theta 1$ | H1 | PATTERN 1 | – | $\theta 1$ | h1 |
| 2 | NECESSARY /NO | 2 | $\Theta 2$ | H2 | PATTERN 3 | S2 | $\theta 2$ | h2 |
| 3 | NECESSARY /NO | 1 | $\Theta 3$ | H3 | PATTERN 2 | S3, $\sigma 3$ | $\theta 3$ | h3 |
| 4 | NECESSARY /NO | 2 | $\Theta 4$ | H4 | PATTERN 3 | S4 | $\theta 4$ | h4 |
| 5 | NECESSARY /NO | 1 | $\Theta 5$ | H5 | PATTERN 2 | S5, $\sigma 5$ | $\theta 5$ | h5 |

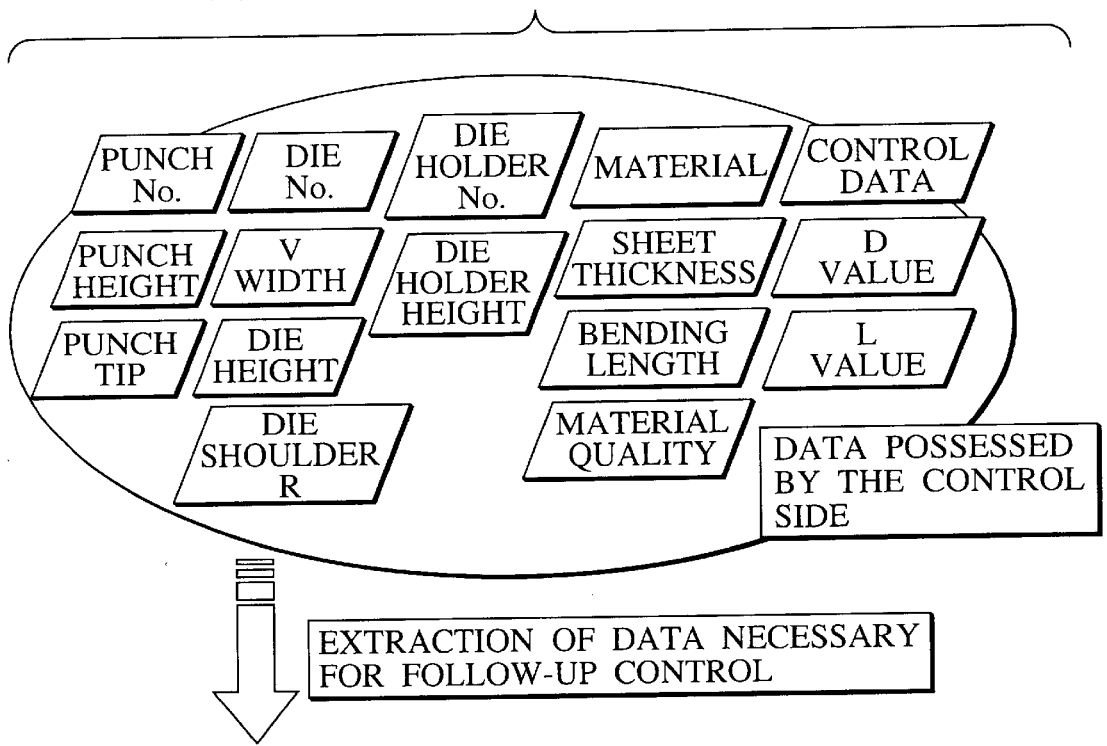

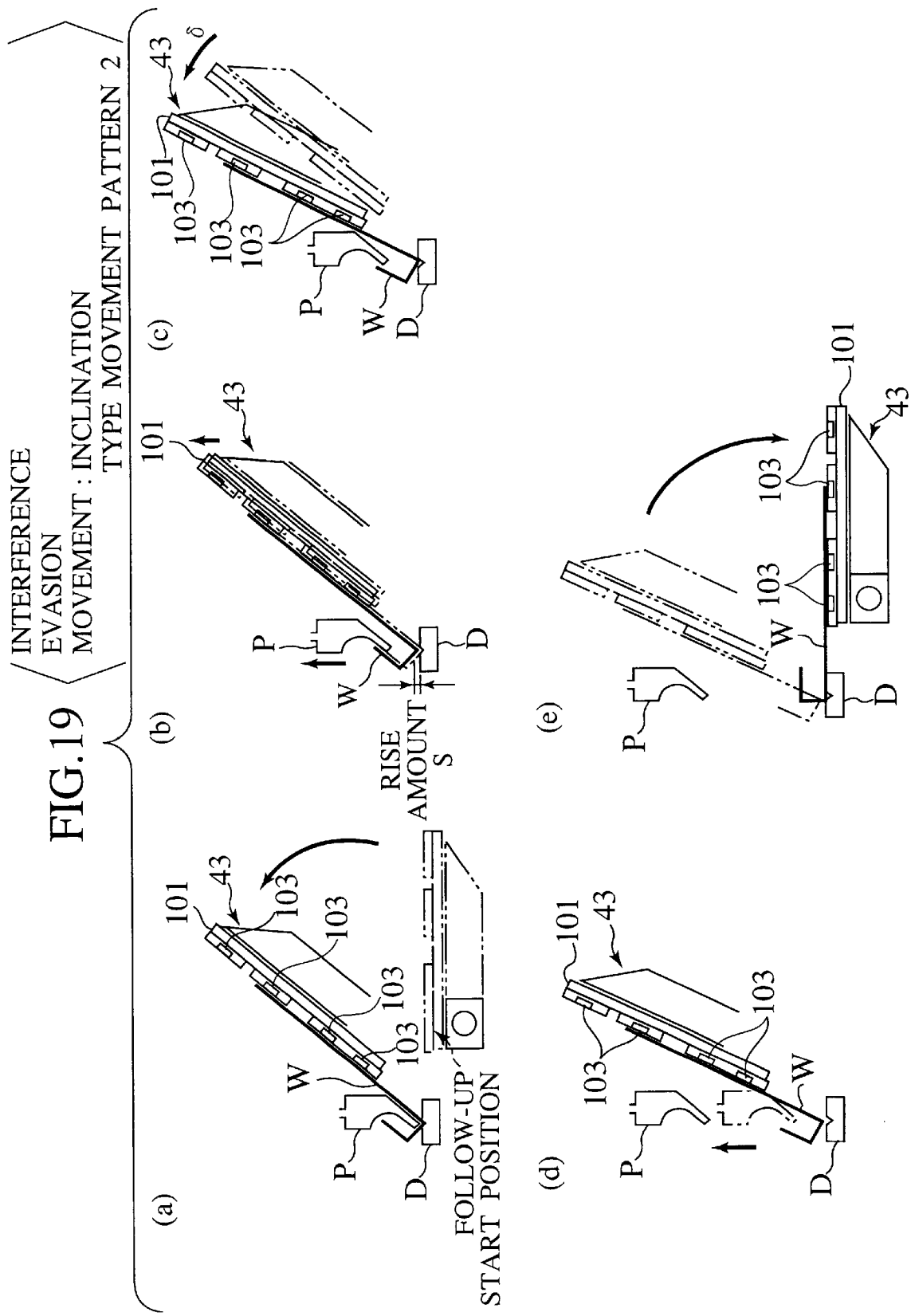

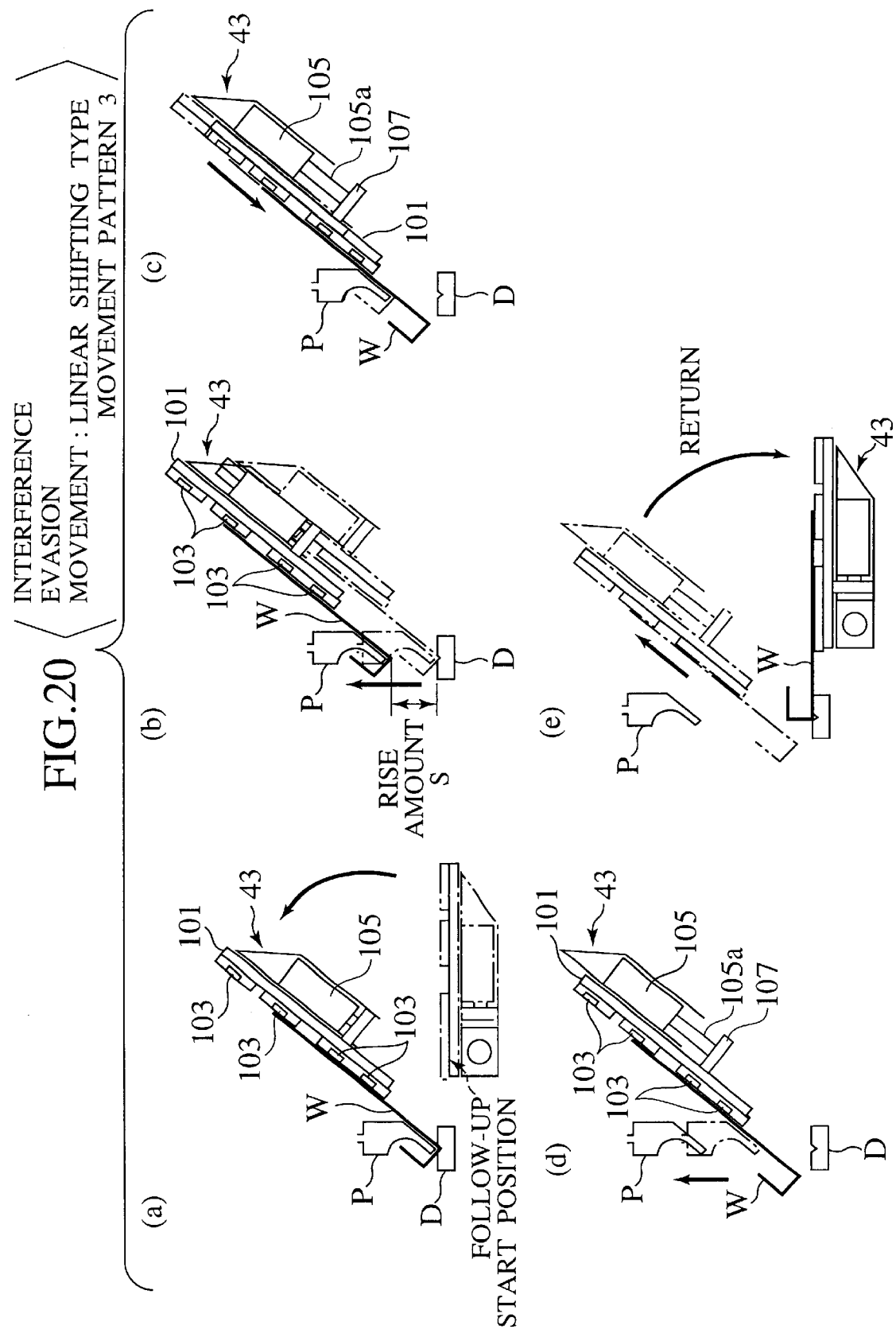
FIG.20 ⟨INTERFERENCE EVASION MOVEMENT : LINEAR SHIFTING TYPE MOVEMENT PATTERN 3⟩

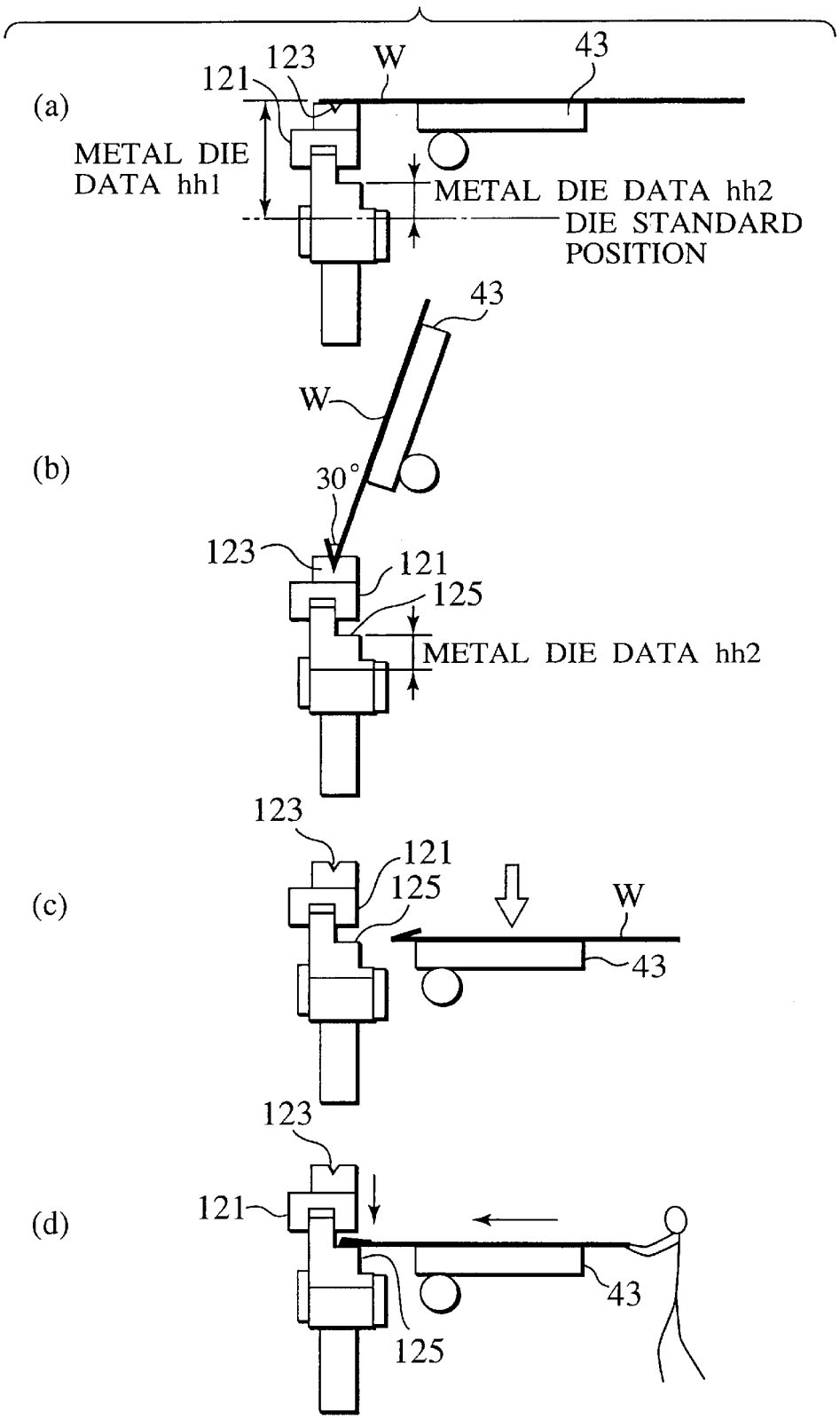
FIG.21 AUTOMATIC HEMMING MOVEMENT DETERMINATION

SHEET METAL BENDING SYSTEM PROVIDED WITH A PRESS BRAKE AND A SHEET METAL SUPPORT DEVICE AND A METHOD TO PREPARE ITS CONTROL DATA AND A COMPUTER READABLE STORAGE MEDIUM THAT STORES ITS CONTROL DATA

This application is a 35 USC 371 of PCT/JP00/04703 filed Jul. 13, 2000.

TECHNICAL FIELD

This invention is related to a sheet metal bending system which includes a press brake and a sheet metal support apparatus which supports the sheet metal work when the sheet metal is bent by the press brake and a method to store the control data and a computer readable memory medium which stores the control data.

BACKGROUND ART

In a press brake where bending process of a sheet metal and the like are performed by combined action of the punch and die, the rise (or jumping) of the work W accompanying the bending process occurs with the shoulder K of the die as the revolving center (refer FIG. 13).

In such a process in course of bending, depending on the size, sheet thickness, sheet material, the work may be bent due to the large mass of the jumped part. In order to prevent this flexure, the worker supported the work or the work was supported by a sheet metal support device that supported the work following its jump.

However, if it is made so that the revolving center of the support arm of this sheet metal support is also on the shoulder K of the die D, the trajectory may be made the same as the rise of the work W, but the structure does not allow to place the rotation axis member as a rotation center at the shoulder K of the die. Formerly, therefore, a link mechanism in Japanese patent 1511802 (JP63-61094) by the applicant of the present patent has been generally used.

Also, the control data of conventional sheet metal bending systems includes bending process data that control mainly the press brake and follow-up control data mainly for control of sheet metal support devices.

The bending process data includes the bending order which is process order of a plurality of bending processes to be made on the work, the punch type to be used in each bending process, the die type, the V breadth of the die, the D value which prescribes the target engagement position of the punch and the die in each bending process, and the L value which prescribes the target position of the back gauge which determines the position of the work so that the line of the work coincides with the bending axis of the punch and the die, and the like.

Also, the bending process data is prepared by an automatic bending programming device called BEND CAM based on, for instance, three face figures and three dimension CAD data of sheet metal products and stored in the processing data server called the host machine. To the host machine, more than one terminal machine which are press brakes are connected making it possible to supply processing data from the host to the terminal machine, and feedback the revised D value, revised L value which are values revised based on processing data of actual processing from the terminal machine to the host machine.

Also in the host machine, not only bending process data but manufacturing machine information, information of metal molds of punch and die, material information, three-dimensional figure information which may display three dimensional models of each sheet metal product by three dimensional CAD, and unfolded figures and the like of each sheet metal product and the like are stored.

In the follow-up control data, the necessity of the sheet metal support apparatus, the number of support arms used, the necessity of interference avoidance movement between the punch and the work when the punch and die are to be separated after the press, and a follow-up timer value which is the period during which the support arm is to be stopped at the follow-up end position.

In preparing these follow-up control data, the bending data is displayed on an input-output device called a press brake pendant and based on the displayed data the worker judges and inputs the necessity of the sheet metal support device, the number of support arms used, the necessity of interference avoidance movement between the punch and the work when the punch and die are separated after the press, and the follow-up timer value to the input device provided on the sheet metal support device.

However, in the link type sheet metal support device, there is a problem that a three axis control device, a height direction control device, a length direction control device and a rotation angle control device for the die height, V width and rise of the work will be required making the total unit a complex and elaborate and costly arrangement.

Also, arranging a large sheet metal support device in front of the press brake may impair the workability.

Also, there is a problem that in the past the bending process data for conventional sheet metal bending systems were stored in the memory device of the host machine and could be used commonly by each terminal machine connected to the host machine but for follow-up control data, the follow-up control data is stored in each sheet metal support device and cannot be used by other sheet metal support devices.

The object of this invention is, in view of the problems in the conventional technology, to provide a sheet metal bending system provided with a sheet metal support device which may accurately follow-up the rise of the work when bent and a memory storage from which the stored control data may be read out by a computer.

The other object of this invention is to provide a read-out computer memory medium which stores methods of storage of control data of the sheet metal bending system and control data of the sheet metal bending system, which enable reuse of follow-up control data which is the control data used by the sheet metal support device together with the press brake, by not only that sheet metal support device but by other sheet metal support devices. With this arrangement time may be shortened and the rate of operation of the sheet metal bending system may be improved.

DISCLOSURE OF THE INVENTION

The present invention is made due to heretofore problems mentioned above. The sheet metal bending system of the present invention has a press brake which bends the work along the bending axis by cooperative action of a punch and die which approaches and separates from each other and a sheet metal support device which supports the work being bent by at least one support arm provided on the front face of this press brake. And the sheet metal support device has a rotation mechanism which rotates the support arm centered around the first rotation axis while rotating the first rotation axis around the second rotation axis and a linear movement mechanism which moves the second rotation axis in the direction of the approach and separation of the punch and die.

In this system, by controlling the rotating mechanism and the linear movement mechanism, the position of the support arm in the direction of the approach and separation of the punch and die and angle of the support arm may be made to coincide with those of the work being bent.

Also, in the method to generate the control data for controlling the sheet metal bending system provided with a press brake and sheet metal support device of the present invention, the press brake has a punch and a die which bends along the bending line on the sheet metal by approaching and separating from each other. And the punch and die has a bending axis. The press brake is provided with a back gauge that determines the position of the sheet metal so that the bending axis coincides with the bending line. The sheet metal support device supports the sheet metal in front of the press brake and is provided with a support arm free to rotate around a rotation axis parallel to the bending axis. The control data is to control the approach and separation motion of the punch and die in order to control the approach and separation motion of the punch and die and at least the rotation movement of the support arm in order to perform a plurality of bending processes to produce sheet metal parts (parts) with a plurality of bending lines. And in the method, the ID of the sheet metal parts are generated; the bending order which is the order of bending the plurality of bending lines and of the punch and die type for bending each bending line is determined; the D value which prescribes the punch and die target engagement position and generation of the L value which prescribes the target position of the back gauge in each bending process is generated; the Z direction position of the support arm at the start of the bending in each bending process based on the Z axis direction size of the die to be used is determined; the target Z axis direction position and the target rotation position $\Theta$ of the support arm in each bending process based on the D value which prescribes the target engagement position of the punch and die and the V width of the die (and the thickness of the sheet) are determined; and the type of the punch and die, and the D value and L value, the height position of the sheet metal support at the start of the process and the target height position and the target rotation position in the bending order and each bending process, are stored in the memory medium together with the sheet metal parts ID By the arrangement, according to the method of generating the control data for controlling the sheet metal bending system provided with a press brake and a sheet metal support device of the present invention, not only bending control data such as D value, L value to control the press brake but also control data for controlling the sheet metal support apparatus may be reused on basis of the sheet metal parts ID.

A computer readable recording medium which stores control data to control the movement of a sheet metal bending system provided with a press brake and sheet metal support device has a construction as follows. The press brake is provided with a punch and die which by mutual approach to and separation from each other bends the sheet metal along the bending line, and is provided with a back gauge to position the sheet metal against the punch and die. And the sheet metal support device supports the sheet metal in front of the press brake and is provided with a support arm that may be rotated freely centered on a rotation axis parallel to the bending axis. The control data is a control data for controlling the approach and separation movement of the punch and die and at least the rotation of the support arm in the bending process which include a plurality of bending stages to produce sheet metal parts which possess a plurality of bending lines, and wherein, the control data comprising: an ID of the sheet metal parts; a process number which is related to the ID and specifies the ith bending process of a plurality of bending processes; a D value which is related to the process number and specifies the target engagement position of the punch and die in the ith bending process; a L value which is related to the process number and specifies the target position of the back gauge in the ith bending process; a V width of the die that is related to the process number and to be used in the ith bending process; a target rotation position $\theta$ of the sheet metal support which is related to the process number and corresponds to the D value which specifies the target engagement position of the punch and die and the V width of the die (and the thickness of the work) in the ith bending process.

With the arrangement, by the computer readable recording medium which stores the control data to control the action of the sheet metal bending system provided with the press brake and sheet metal support device of the present invention, not only the bending control data such as the D value, L value and the like but the follow-up control data for controlling the sheet metal support device may be reused on basis of the sheet metal parts ID.

It is preferable that the sheet metal support be made free to move in the direction that the punch and die approach and separate.

It is preferable that the control data is related to the process number and possess punch and die data that prescribe the punch type and die type to be used in the ith bending process.

In the control data, it is preferable that at least one of the following is provided.

the compensation number $\delta\theta$ of the target rotation position of the sheet metal support in the ith bending process, which number is linked to the process number;

the initial position of the sheet metal support in the ith bending process, which position is linked to the process number;

the number (including zero) of sheet metal supports in the ith bending process, which number is linked to the process number;

the interference avoidance motion pattern of the sheet metal support in the ith bending process, which is linked to the process number, which pattern is linked to the process number; and the disengagement position S and the disengagement angle $\delta$ of the sheet metal support in the ith bending process, which position and angle are linked to the process number.

BRIEF DESCRIPTION OF DRAWINGS

FIG. 5(a) shows the cross section view viewed from VA of FIG. 4, and (b) is the front figure viewed from VB direction of FIG. 6.

FIG. 14 shows the arrangement of the control data for each sheet metal parts in the sheet metal bending system provided with the press brake and the sheet metal support apparatus of the present invention.

FIG. 15 shows the necessary data and calculation formula for follow-up control by the sheet metal support apparatus.

FIG. 19 is a conceptual drawing including the work side view explaining the interference avoidance movement pattern 2 by which the interference of the punch and work when the punch and die are separated is avoided by inclining the work.

FIG. 20 is a conceptual drawing including the work side view explaining the interference avoidance movement pattern 3 by which the interference of the punch and work when the punch and die are separated by moving the work linearly.

FIG. 21 is a figure that explains the method of automatic decision of the control data for hemming operation in the sheet metal bending system of the present invention.

BEST MODE FOR CARRYING OUT THE INVENTION

Figure 1:
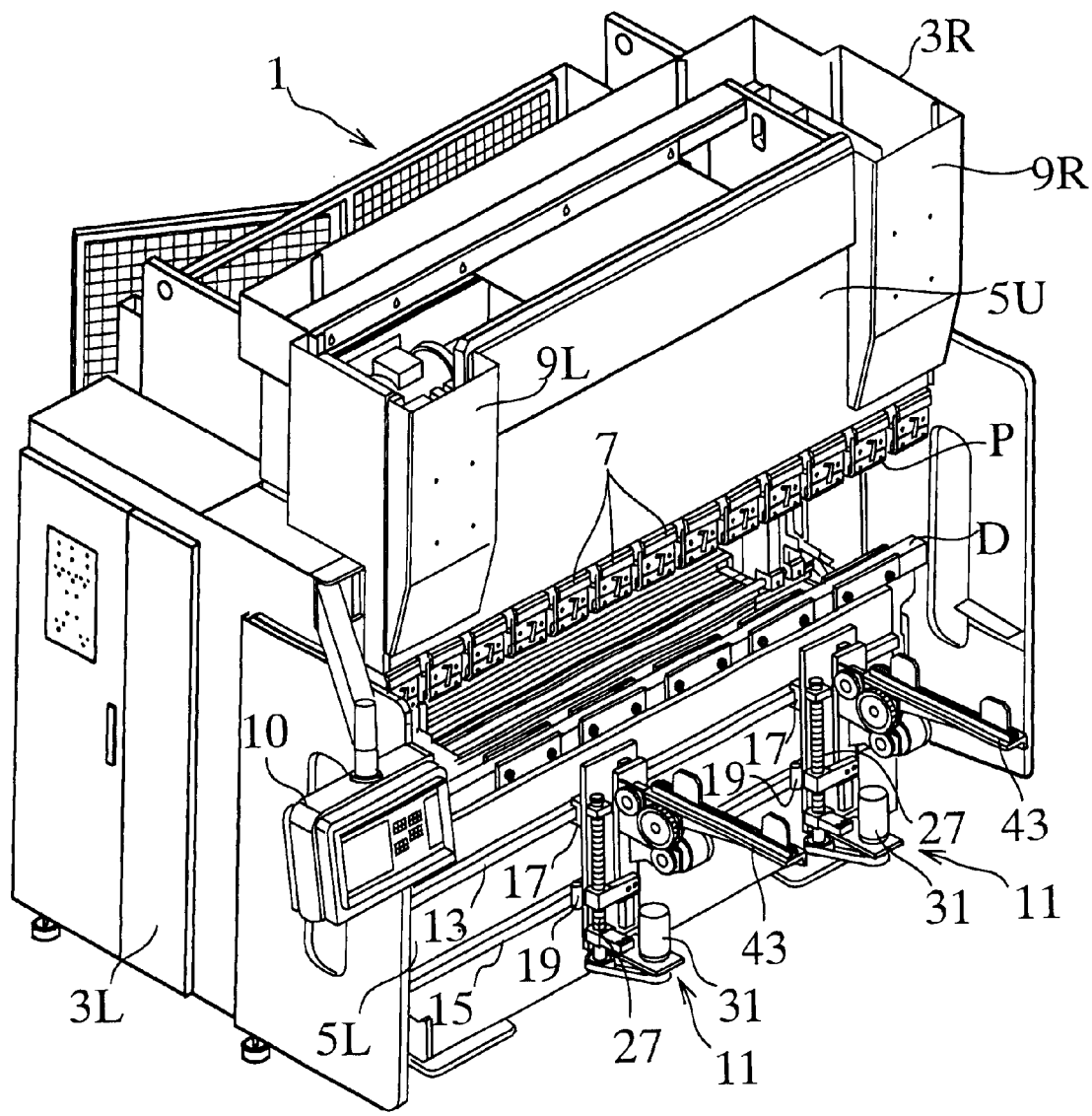
FIG. 1 shows an perspective view of the press brake and sheet metal support device of the sheet metal bending system of this invention.
Figure 2:
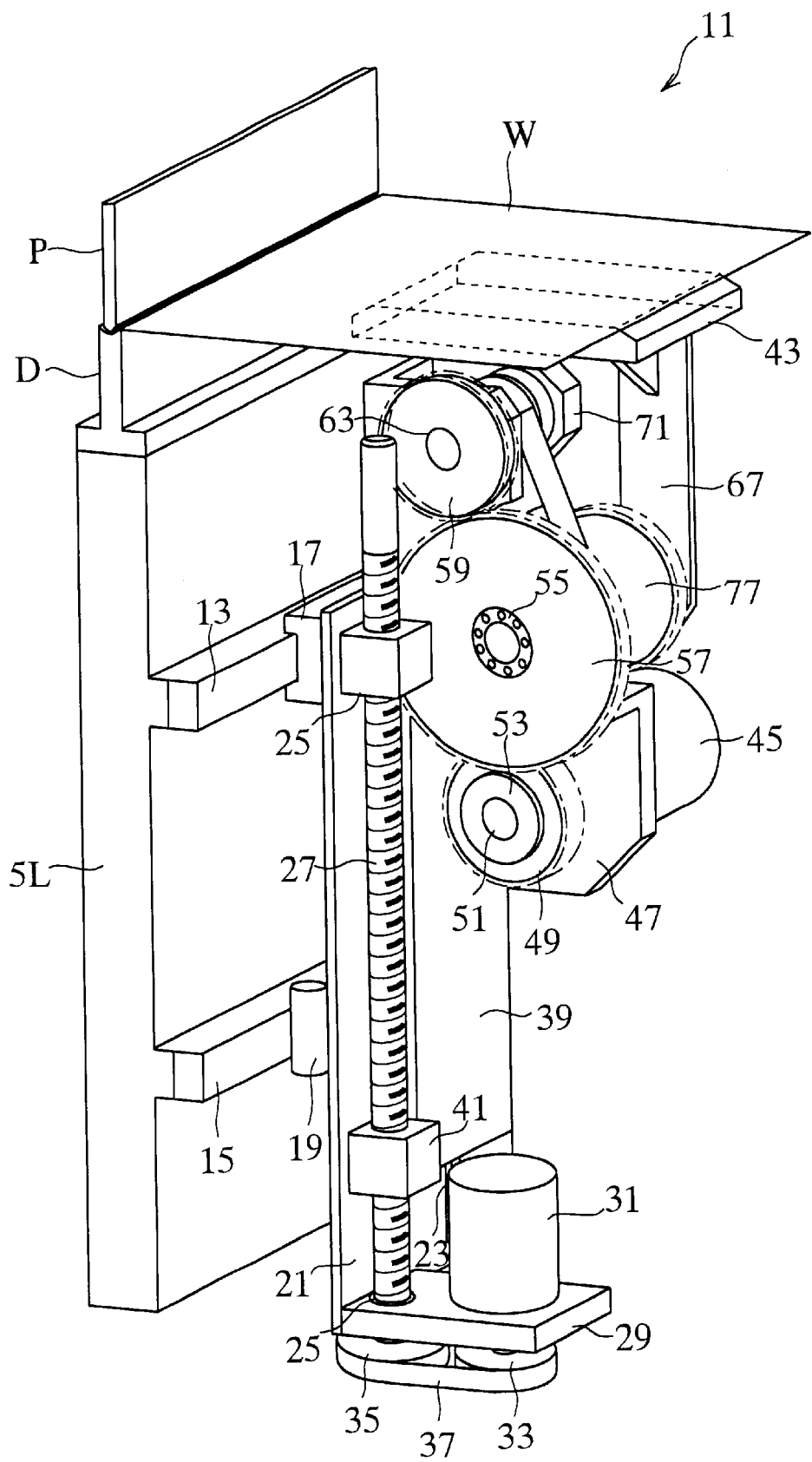
FIG. 2 shows perspective view of the sheet metal support device of the sheet metal bending system of this invention.
Figure 3:
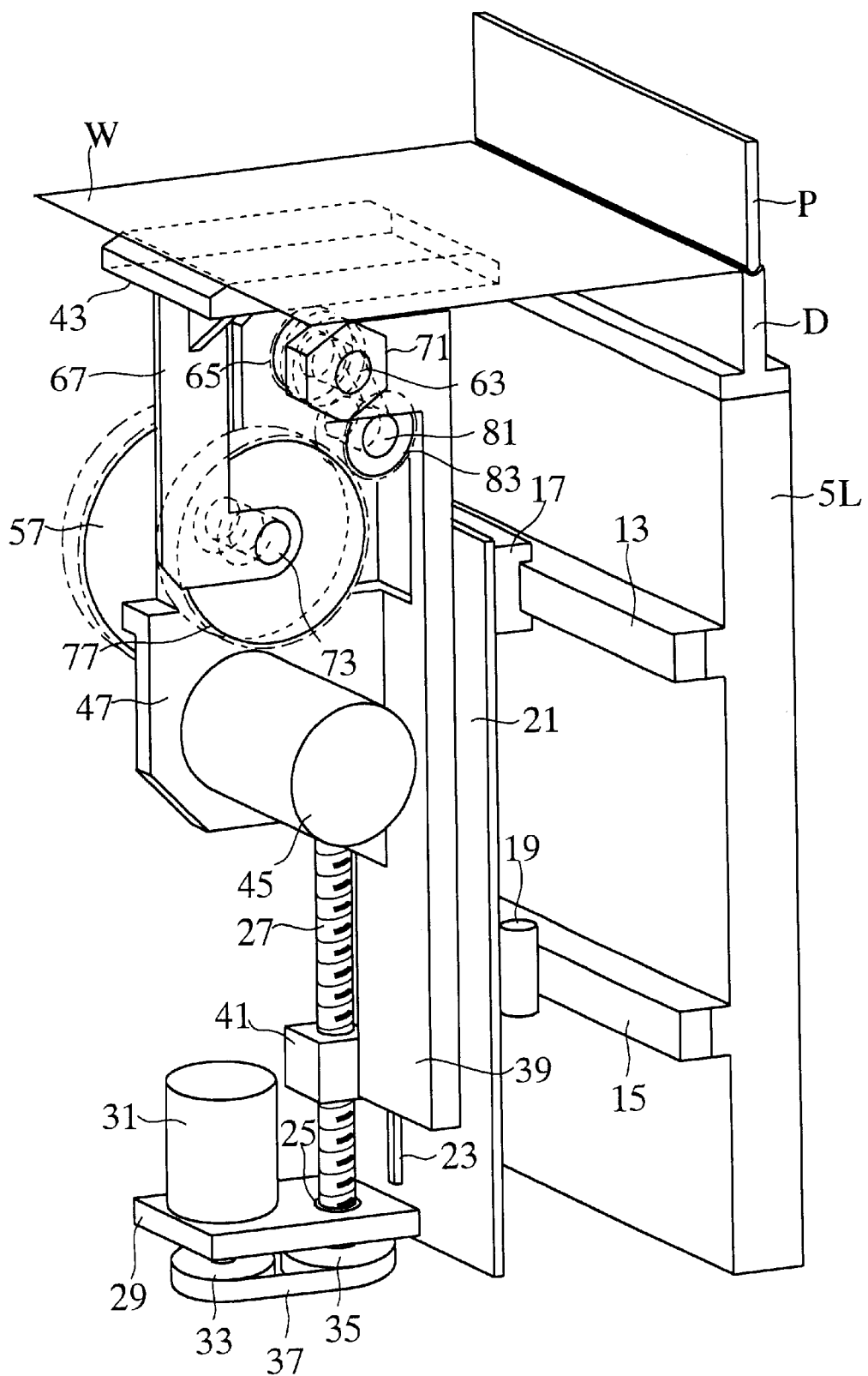
FIG. 3 shows a perspective view of the sheet metal support device of the sheet metal bending system of this invention.

FIG. 1 is a perspective view showing an exterior of the press brake 1 and the sheet metal apparatus 11 of the first embodiment of the present invention.

In this press brake 1, an upper table 5U which may be moved freely up and down is provided in between the upper part front face of the left and right side plates 3L, 3R, and on the lower edge part of this upper table 5U, punch P are fixed by a plurality of intermediate plate 7. The upper table 5 may be moved up and down by driving mechanisms 9L, 9R which are placed on the upper part of front faces of the side plates 3L, 3R.

Also, a lower table 5L is attached on the lower part of the front face of the left and right side plates 3L, 3R and dies D are set free to attach or detach on the upper edge of this lower table 5L. On the side plate 3L, a control device 10 that, for instance, controls press brake 1 is provided.

With the arrangement, bending process on work W positioned above die D may be made by coactions of the punch P and die D by moving the upper table 5U up and down by the driving mechanisms 9L, 9R.

With reference to FIGS. 2–10 in addition to FIG. 1, a sheet metal support device 11 is provided on the front face of press brake 1 (right side face in FIG. 1). On this sheet metal support device 11, left-right linear guide rail 13 is provided in the left-right direction (the elongated direction of the lower table 5L) on the upper part of the front face of table 5L, and on the lower part of the front face a linear guide rail 15 is provided in the left-right direction.

On the left-right slider 17 which may move freely along the linear guide rail 13 and the roller 19 which rolls along the linear guide rail 15, a pair of base plates 21 (only one of the units is shown in FIGS. 2–10) are provided, and the spacing thereof is regulated according to the breadth of the work to be bent.

On the front face of each base plate 21, an up-down linear guide rail 23 is furnished in the up-down direction. Also on the front face of 21, a screw 27 for up-down movement mechanism is furnished which is supported free to rotate on the bearings 25 furnished at the top and down positions and an up-down servomotor 31 is furnished on the bracket 29 fitted on the lower edge of the base plate 21. A belt is wound around in between drive pulley 33 that is fixed on the rotating axis of the up-down servomotor 31 and the driven pulley 35 that is furnished on the lower edge of the screw part 27.

On the up-down linear guide rail 23, there is provided an up-down slider 39, and nuts 41 are fixed to the up-down slider 39. Thus, by rotating the screw part 27 by the up-down servomotor 31, the nuts 41 are moved up and down so as to move the up-down slider 39 up and down.

On the front face of the up-down slider 39, there is a support arm 43 that follows the rise of the bent work W and a rotation servomotor 45 for the rotation mechanisms for rotating this support arm 43. On the support arm 43, a magnet (not shown in the figure) is provided to support the sheet metal (work) W.

By referring mainly to FIGS. 9(a), (b), a rotation servo motor 45 is installed on a bracket 47 which is set up vertically on the up-down slider 39, and has a first gear 53 which is furnished on a rotation driving axis 51 via a reduction gear 49, and a second gear 57 which is an idle gear engaged to this first gear 53 and is free to rotate by bearing 55, and a third gear 59 which is rotated by engagement with this second gear 57.

The third gear 59 is attached to one of the ends of a first axis 63 as a fixed point by key 61 (refer FIG. 9(b)) and on the other end of the first axis 63, the fourth gear 65 which is a fixed gear is rotatably mounted on the first axis 63 through a bearing 66. Also on the central part of the first axis 63, a rotating axis support plate 67 that is a rotating plate is fixed by key 69 (refer FIG. 9(b)).

Therefore, when the rotation servomotor 45 is driven, the first gear 53 will rotate, and by the second gear 57 the third gear 59 will rotate and the first axis 63 will rotate as one body and also the rotation axis support plate 67 will rotate as one body by the key 69. Here the fourth gear 65 is a fixed gear that is free to rotate relative to the first axis 63; as it is fixed to the up-down slider 39 by block 71 (refer FIG. 2, FIG. 3), it remains stationary although the first axis 63 is rotating.

On the lower edge part of the rotating axis support plate 67 in FIG. 9(b), the second axis 73 which acts as the rotation center of the support arm 43 is fixed by a bearing 75 free to rotate and the fifth gear 77 which is a rotation gear is provided on this second axis 73. The support arm 43 is fixed to this fifth gear 77 by bolt 79.

Figure 10:
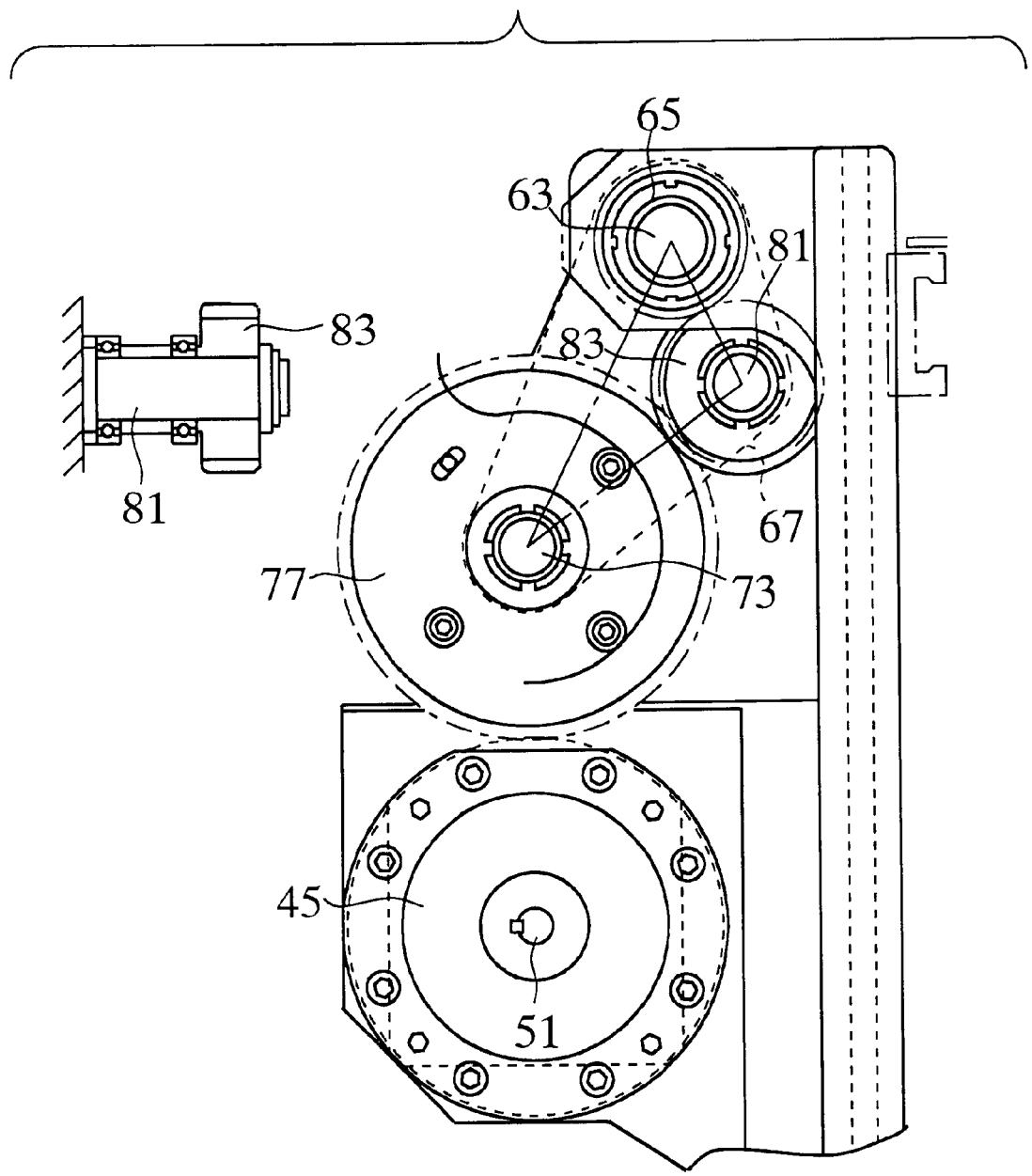
FIG. 10 is the side view viewed from the X direction of FIG. 9(b).

Referring to FIG. 10, in between the fourth gear 65 and the fifth gear 77, the sixth gear 83 that is supported free to rotate by the rotation axis support plate 67 by the third axis 81 is provided engaged to both the fourth gear 65 and the fifth gear 77.

Next, the action of the sheet metal support apparatus 11 will be explained with reference mainly to FIG. 9(a), (b). By driving the rotation servomotor 45, the first gear 53, the second gear 57, the third gear 59 will be rotated and the first axis 63 will rotate. Thereby the rotation axis support plate 67 that is integrated to the first axis 63 by key 69 will rotate.

When the rotation axis support plate 67 rotates, the sixth gear 83 which is axially supported by the third axis 81 on the front face of the rotation axis support plate 67 (front side of the drawing in FIG. 10) and engages with the fixed fourth gear 65 will revolve around the fixed fourth gear 65 while rotating. Therefore the fifth gear 77 engaged with the sixth gear 83 will also rotate around the second axis 73 while revolving around the first axis 63, and the support arm 43 which is fixed to the fifth gear 77 by bolt 79 will rotate centered on the second axis 73 and will follow the rising angle (rotation angle) of the work W.

Figure 13:
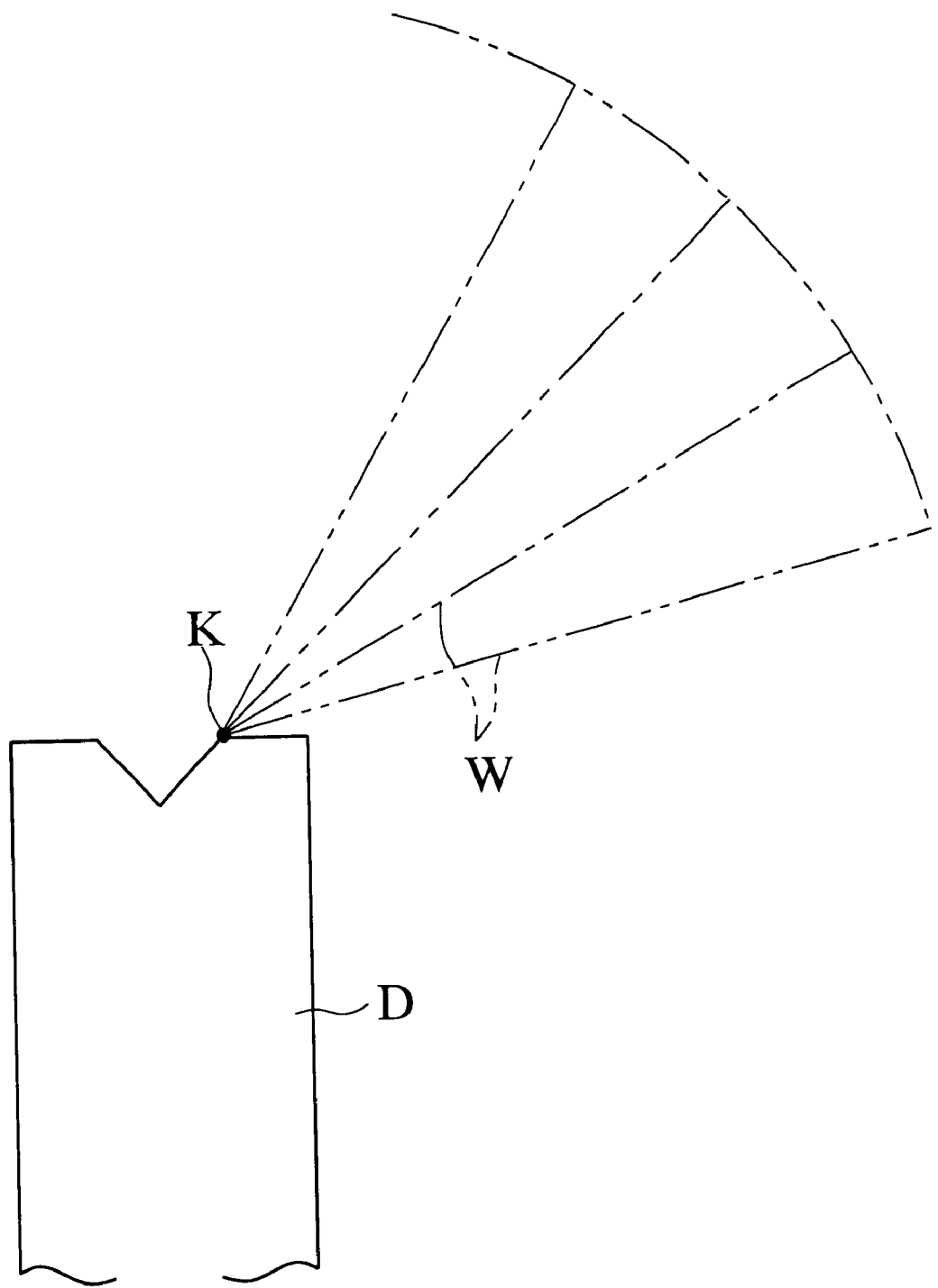
FIG. 13 describes the work movement locus during the bending process.

As described already, the rise of the work W accompanying the bending process arises by rotation centered on the shoulder part K of the die D. FIG. 13 shows the movement trajectory of the work during the bending process.

Figure 11:
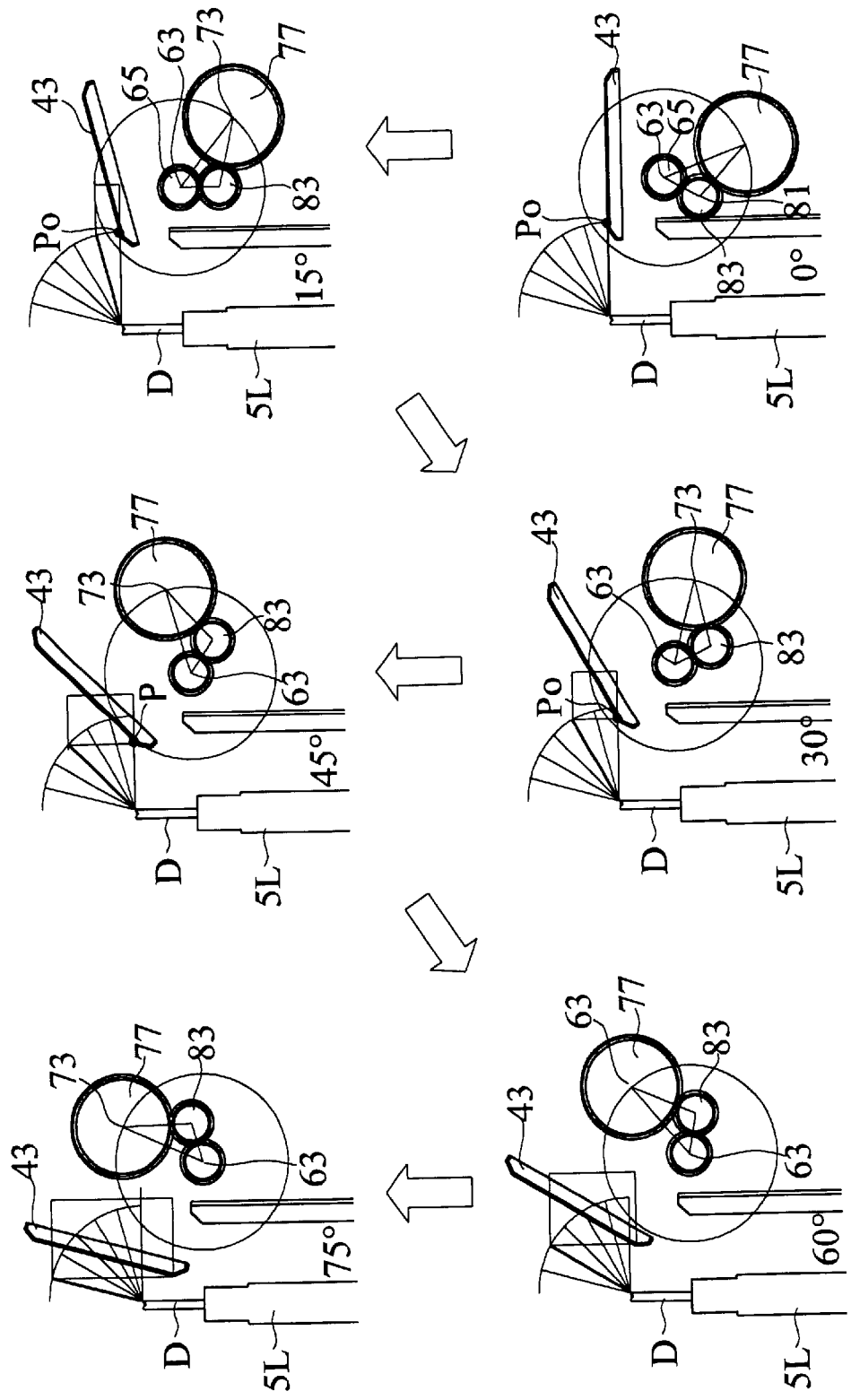
FIG. 11 shows the rotation state of the follow-up plate at each angle.

With reference to FIG. 11, the trajectory of the rise of the work W and the trajectory of the second axis 73 of the fifth gear 77 that is the rotation center of the support arm 43 will be described. The angle shown in the figure is the rotation angle of the work W and also the inclination angle of the support arm 43, As shown in FIG. 11, when the rotation angle of the work W increases slowly anticlockwise (arrow direction in FIG. 11) from 0 degree, the second axis 73 which is the revolution center rotates centered on the fourth gear 65 and the first axis 63.

Consequently, as the support arm 43 rotates with the center on the second axis 73, an arbitrary point P on the support arm will always be at the same position in the back and forth direction as that of the rise trajectory of the work W (that is, it is a equal distance from the die center).

Figure 12:
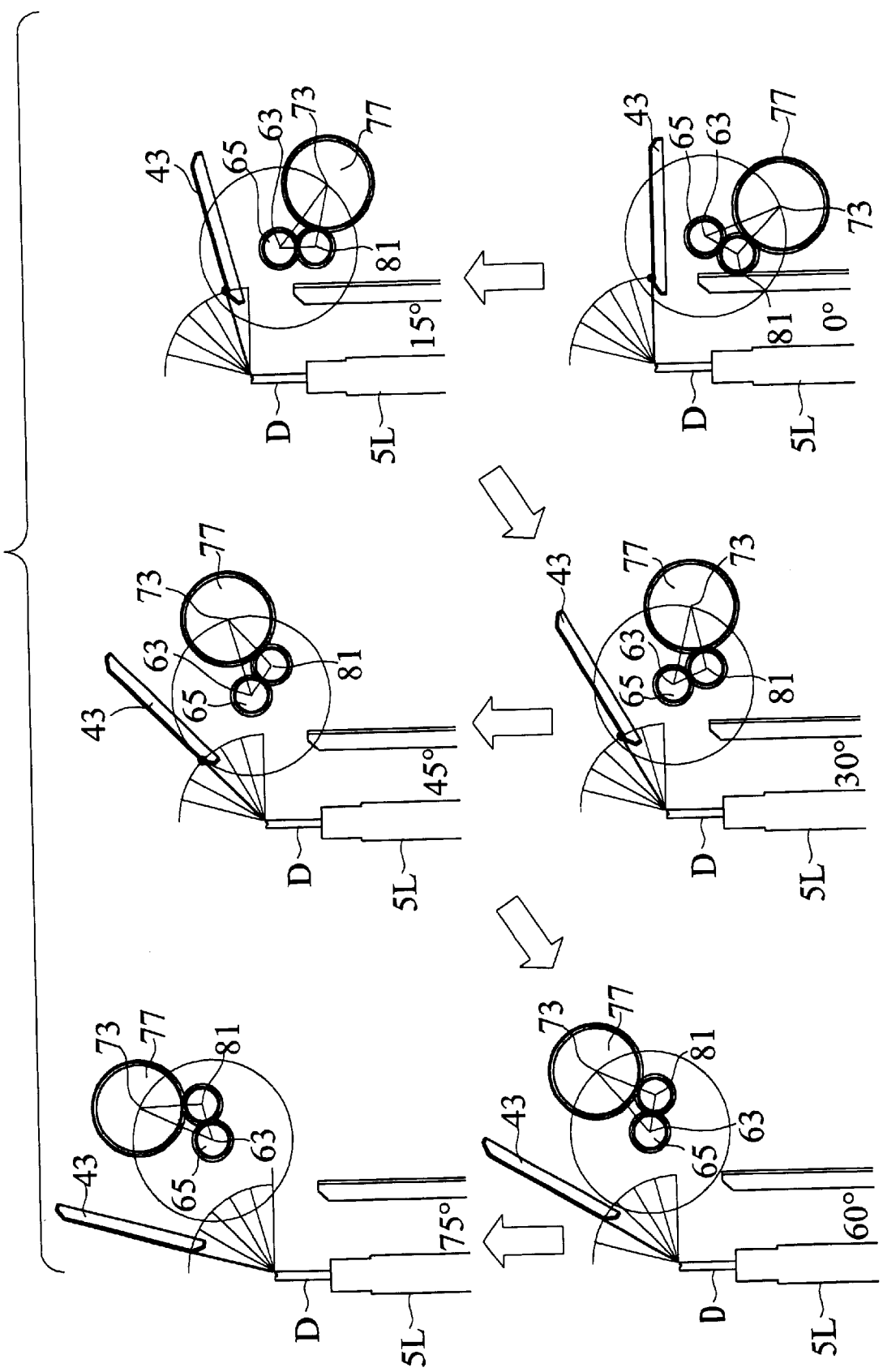
FIG. 12 shows the up and down movement in addition to the rotating state of FIG. 11.

Therefore, as shown in FIG. 12, by moving the up-down slider 39 up and down by the up-down servo motor 31, screw part 27 and nut part 41 to move up and down the support arm 43 by an amount corresponding to the bending angle of the work W, the support arm 43 may be made to follow the work accurately.

From the above results, in the ascent trajectory of the work from the start of the ascent to the bending angle of near 30 degrees, the moving distance in the back and forth direction is small; thus, by revolving the second axis 73 which is the rotation center in the direction away from the die D, the follow up plate may be moved in a trajectory closer to the ascent trajectory of the work W compared to when the rotation center is fixed. Thus the work may be supported properly by a simple and compact structure. Also, cost down of the apparatus may be contrived.

Also, this invention is not limited to the embodiment of the invention and by appropriate changes, it may be operated by other modes. That is, the control of the servomotor 45 for rotation and the control of the up-down servomotor 31 may be made manually by the eye of the operator. It may be controlled automatically by the control device 10 by linkage with the amount of movement of the upper table 5U that is a ram. In this case, a well-known stroke amount detection device or a bending angle detection device will be used together.

Figure 4:
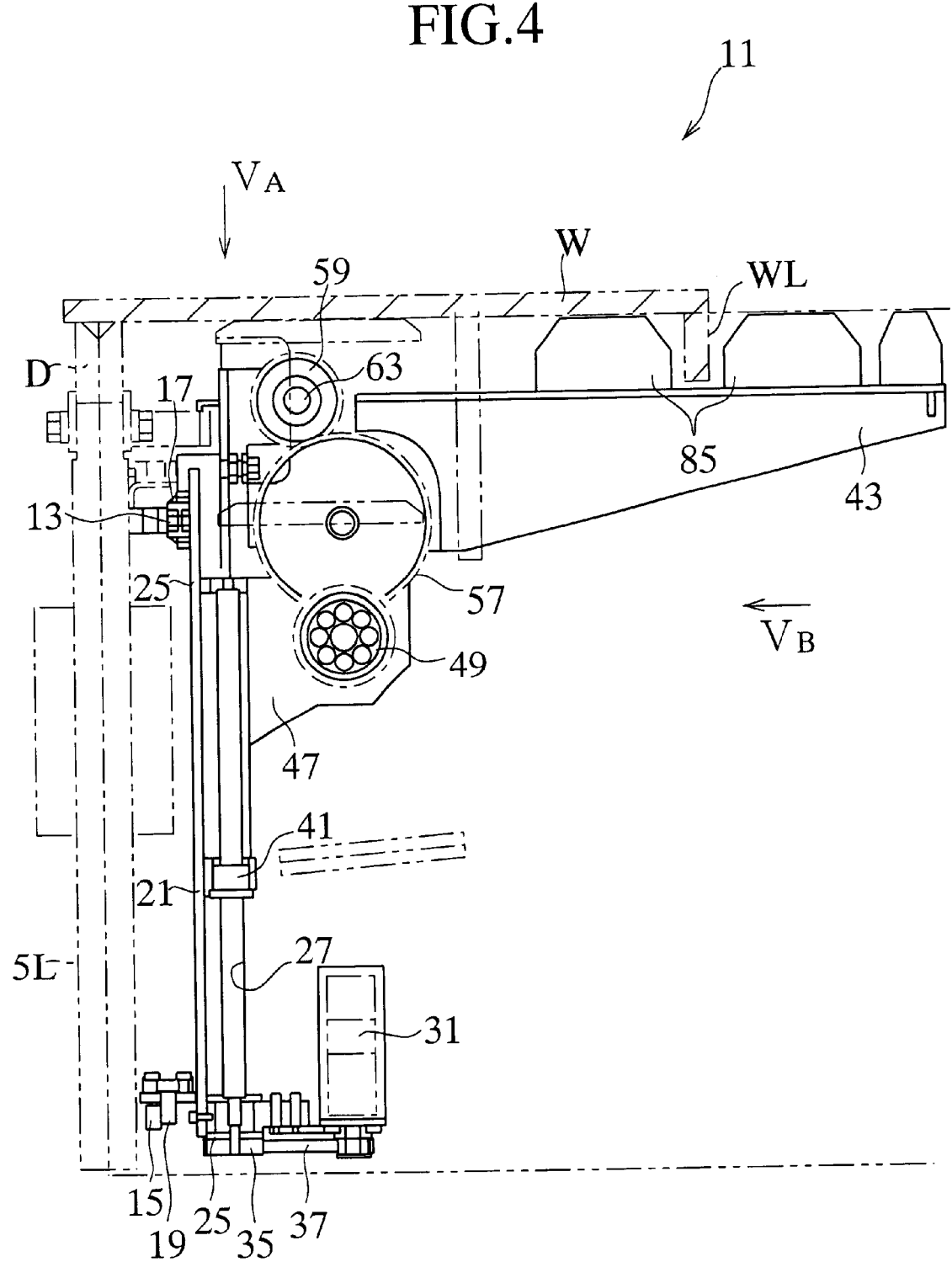
FIG. 4 shows the side view of the sheet metal support device of the sheet metal bending system of this invention.
Figure 6:
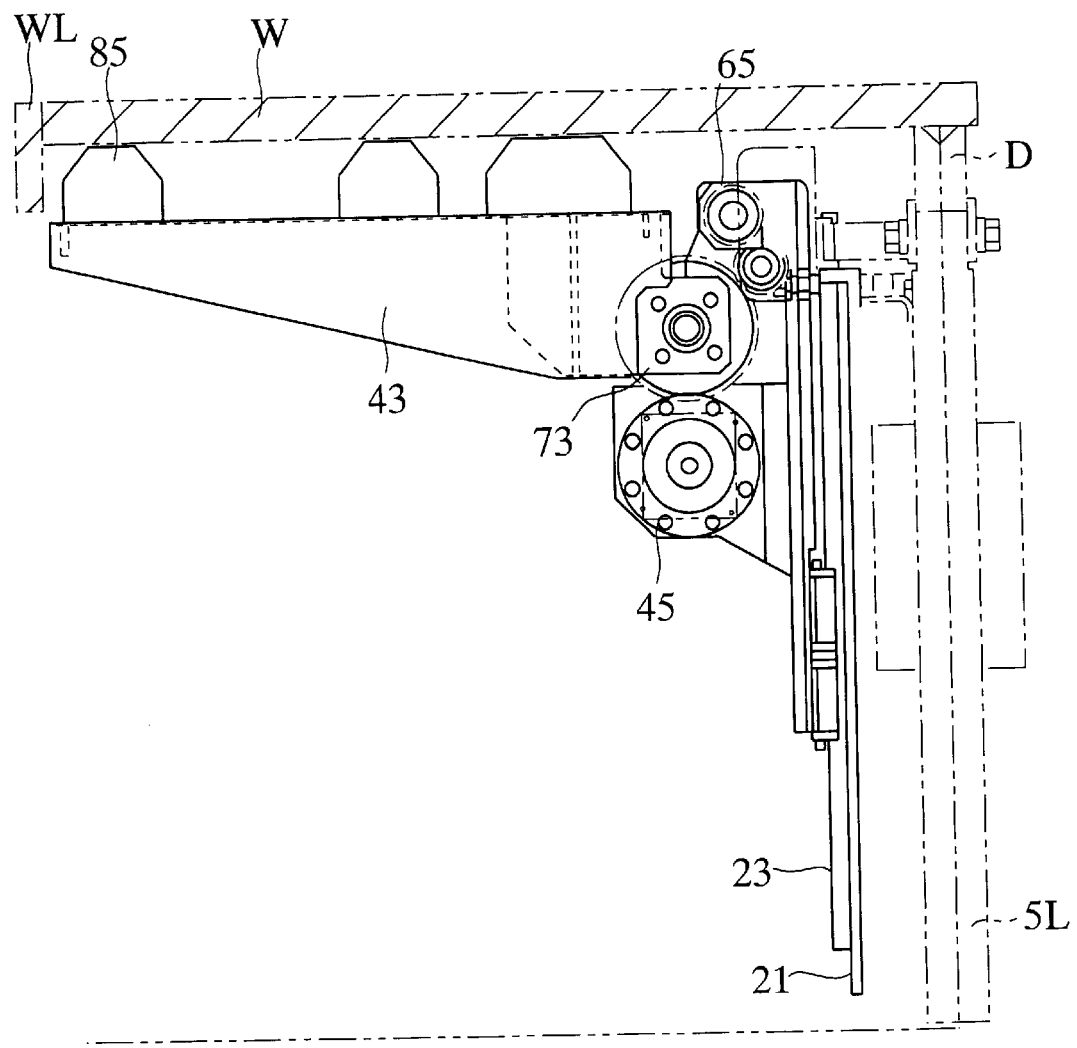
FIG. 6 is the side view viewed from the VI direction in FIG. 5(b).
Figure 7:
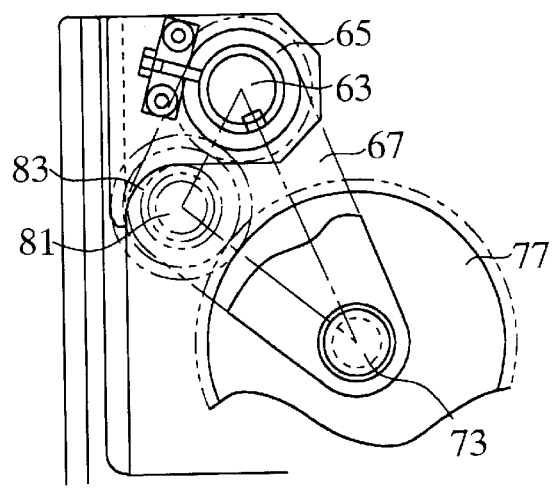
FIG. 7 is an enlarged view of the principal part of the rotating mechanism.
Figure 8:
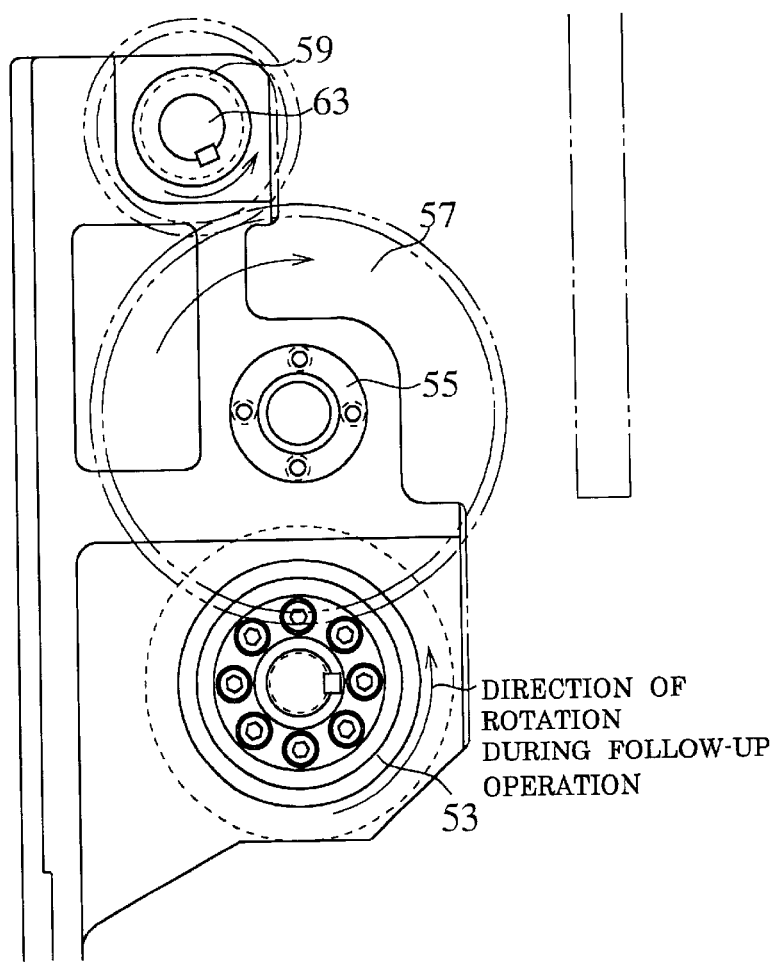
FIG. 8 is an enlarged view of the principal part of the rotating mechanism.
Figure 9:
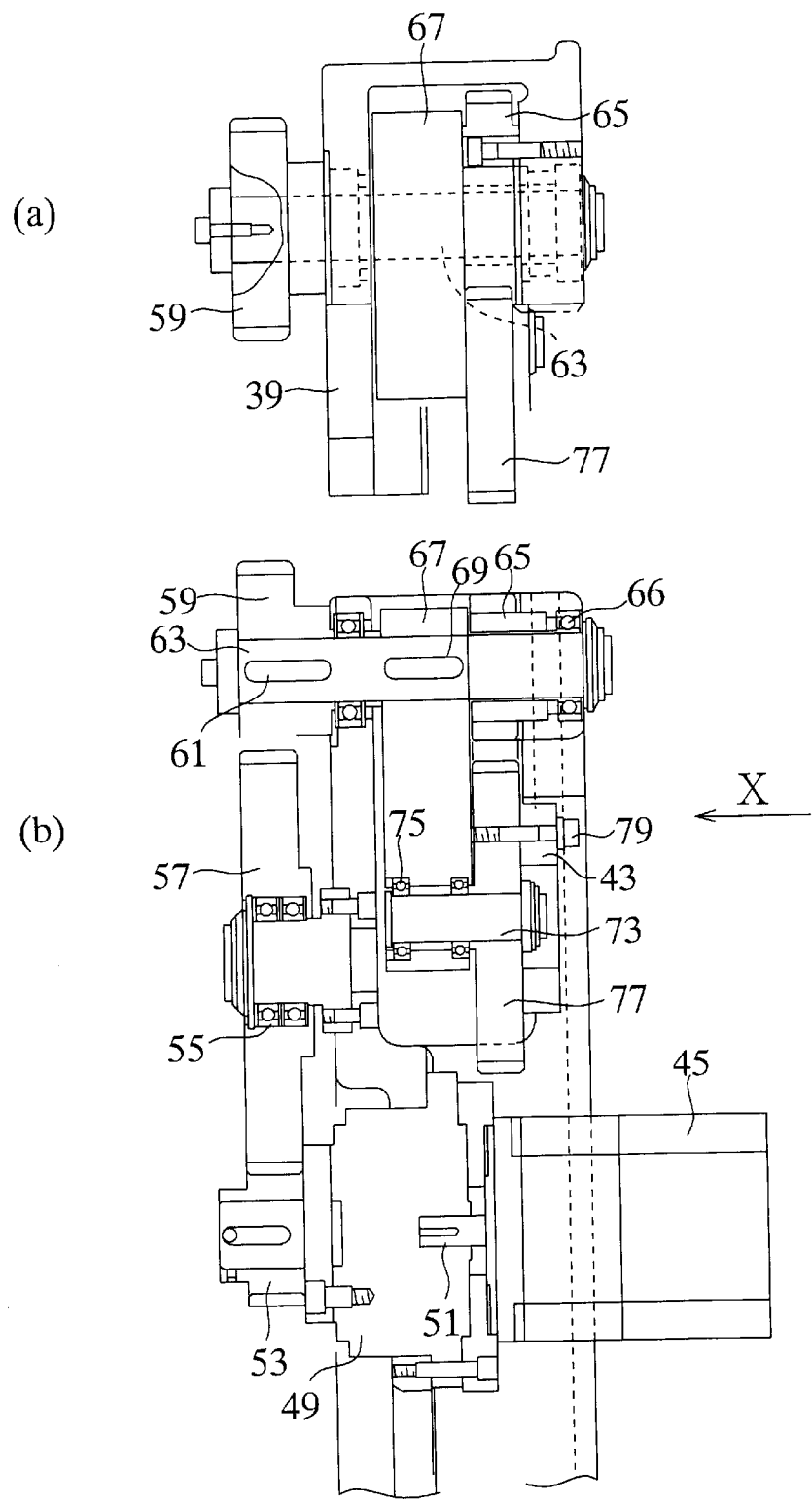
FIG. 9(a) is an enlarged view of FIG. 5(a), and (b) is an enlarged view of part of FIG. 5(b).

Also the shape of the support arm 43 is not determined particularly but, for instance by reference to FIG. 4, in case that work W has a downward bent flange WL, the work W may be supported by a block 85 provided on the support arm 43.

Next, by reference to FIGS. 14–18, the method of generating control data of the sheet metal bending system of the present invention will be explained.

FIG. 14 is the composition of control data that is formed by the method for forming the control data of the sheet metal bending system of the present invention and shows the control data of a sheet metal part specified by a certain ID.

This control data is composed of bending process data shown in FIG. 14(a) and follow up data shown in FIG. 14(b); the bending process data and the follow-up data respectively includes a variety of data items for each process number which indicates the bending order which are the bending process order of a plurality of bendings when making sheet metal parts. And these control data are stored in a server provided with a database called the host machine which is connected by LAN and the like so that the control data may be supplied to more than one sheet metal bending system.

The bending process data for each process number i is provided with the D value which regulates the aimed engagement position of the punch and die in the ith bending process, the L value which regulates the aimed position of the back gauge in the ith bending process, the correction value $\alpha$ of the D value which is inputted based on the result of trial bendings of the ith bending process, the correction value $\beta$ of the L value which is inputted based on the result of trial bending of the ith bending process, the pull back value (PB) which removes the back gauge to the rear when the punch contacts the work in the ith bending process, the contact position (y, z) in the ith bending process, the punch type Pi in the ith bending process, and the die type Di, the value Vi of the V width of the die Di in the ith bending process.

The follow-up data for each process number i include whether or not the sheet metal support apparatus is required in the ith bending process, the number of support arms necessary in the ith bending process, the target rotation position $\Theta$ i of the support arm in the ith bending process, the target height position Hi of the support arm in the ith bending process, whether or not the avoidance-of-interference movement when the punch and die are separated is necessary in the ith bending process and the interference avoidance movement pattern which shows its pattern, the disengagement position Si and the disengagement angle $\delta$ i which are the control quantities of the interference avoidance movement in the ith bending process, the follow-up angle revised value $\theta$ i based on the result of the trail bending in the ith bending process and the follow-up start height hi which is the height at which the support arm starts to follow-up the rise of the work are included.

FIG. 15 is a figure that describes data and formulas for the calculation thereof necessary for the follow-up control of the support arm of the sheet metal support apparatus, which follows the rise of the work.

In the database server which is the aforementioned host machine, data of the punches, data of the dies, data for die holders, data on materials, the D value which regulates the target engagement position of the punch and die and the L value which regulates the target position of the back gauge, which are the control data in each bending, are stored.

In the punch data, there are data on the size and form for each punch No. which is the ID that specifies the punch type. This includes punch height and form of the punch tip data.

Similarly, in the die data, there are data on the size and form for each die No. which is the ID that specifies the die type. This includes the V width that is the width of the V shaped bending groove formed on the upper surface of the die, the die height and the die shoulder R.

Similarly, in the die holder data, there are data on the die holder height for each die holder no. which is the ID that specifies each die holder type.

Also in the material data, there are data on sheet thickness, bending length, material property, specific gravity or the weight per unit area for each variety of sheet metal material in correspondence to the material classification symbol.

And in the method for preparing data for controlling the action of the sheet metal bending system which is provided with the press brake and a sheet metal support apparatus of the present invention, the die height, die holder height, V width, D value, D axis speed inputted by the worker, which are stored in the database server of the host machine, will be regarded as input for the calculation.

On basis of the die height and die holder height, the table follow-up start height which is the height where the sheet metal support apparatus starts to follow the rise of the work will be calculated.

This relation may be described by the equation, f1 (die height, die holder height)=start height of table follow up.

Also, based on the V width and D axis instructions, the target angle position Θ which is the inclination of the support arm of the sheet metal support apparatus will be calculated.

This relation may be described by the equation, f2 (V width, D axis instruction)=target rotation position Θ of the support arm.

Also, the position H of the target height that is the height of the support arm of the sheet metal support device is calculated based on V width and D axis instruction.

This relation may be described by the equation, f3 (V width, D axis instruction=target height position H of the support arm.

Also the movement speed of the inclination and the up-down movement of the support arm of the sheet metal support apparatus are calculated based on V width and the D axis appointed speed.

This relation may be described by the equation, f4 (V width, D axis appointed speed)=movement speed of the rotation axis and up-down axis.

Next, the method of generating the control data to control the movement of the sheet metal bending system of this invention will be explained with reference to the flow chart of FIG.. 16 or FIG. 18.

Figure 16:
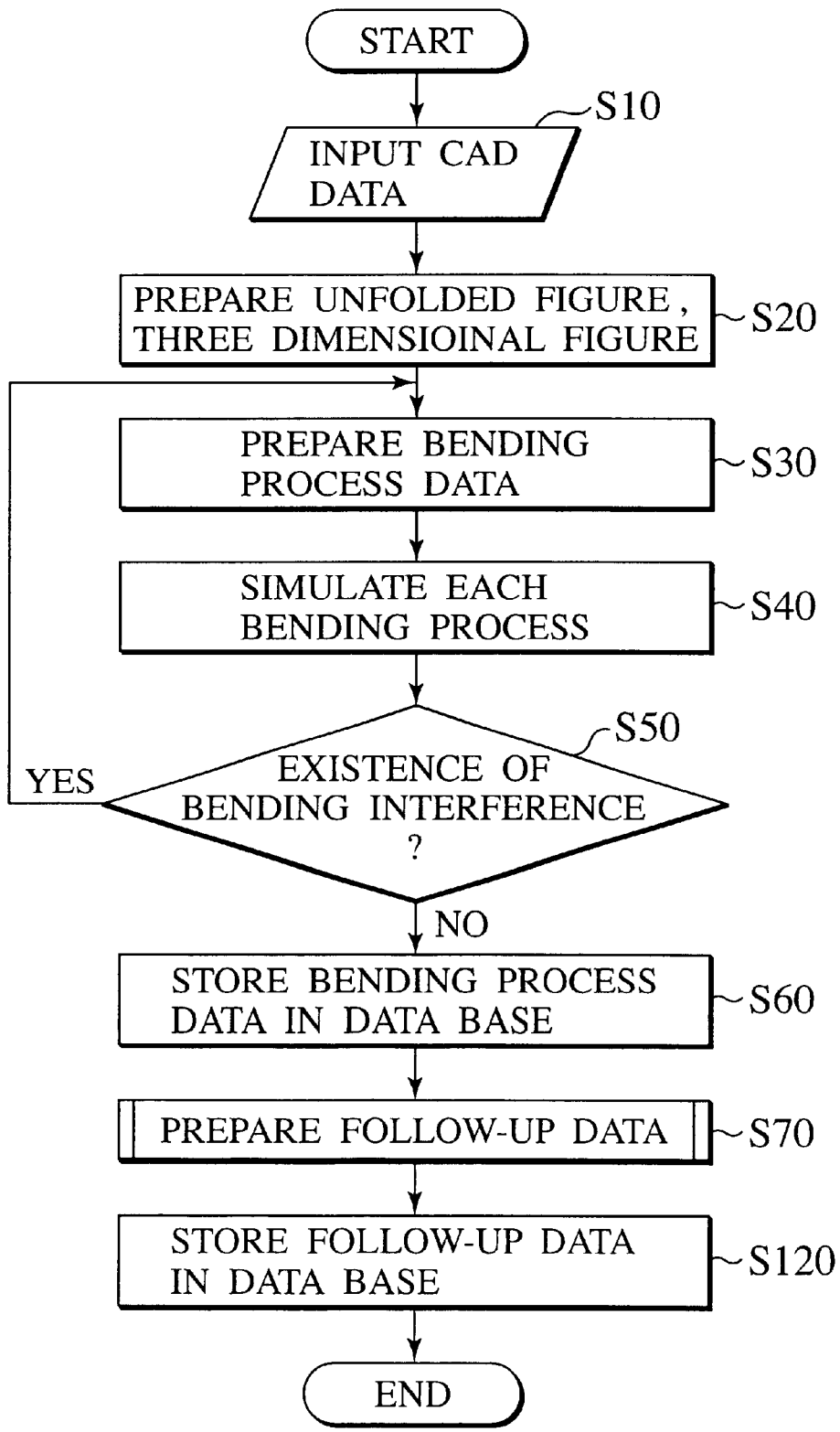
FIG. 16 shows an outline flow chart that describes the method of generating control data to control the action of the sheet metal bending system of the present invention.

FIG. 16 is an outline flow chart that describes the method of generating control data to control the operation of the sheet metal bending system of this invention.

In FIG. 16, first the CAD design data of the sheet metal parts is inputted (S10). This may be a three face figure data by a two dimensional CAD or a three dimensional CAD.

Next, based on the CAD data, the unfolded figure and three-dimensional figure are drawn-up (S20). Next the bending process data is prepared (S30). This bending process data includes the process number which is the order of bending in the plurality of bending processes, the D value which regulates the target engagement position of the punch and die of each process number, the L value which regulates the target position of the back gauge, the pull back amount (PB) which is the amount of removal of the back gauge backwards when the punch contacts the work, the contact position (y, z), the punch type Pi and the die type Di.

Next, bending simulation for each bending process is made (S40), and judgment is made whether or not in the bending process the work and the punch or one part and another part of the work interfere with each other (S50). If there is bending interference, by returning to the bending process data formation step S30, the bending process is revised so that interference is avoided.

If there is no interference, the bending process data with this sheet metal part ID conferred is stored in the memory medium of the database server (S60).

Next, the follow-up data which is the control data which controls the sheet metal support apparatus is prepared (S70), and by storing the follow-up data with this sheet metal parts ID added in the memory medium of the database server (S120) the process will be completed.

Next by referring to FIG. 17, the preparation of the follow-up data that is step S70 in FIG. 16 will be described in detail. First, a bending step that is to be processed is selected (S72). Normally processing is made successively from the first bending process on. Next the size of the work from the bending line during the bending process in the direction of the operator is calculated and the weight is evaluated by reference to the size and the property of the material from the database (S74). If this weight exceeds the designated value, or if the width of the work in the bending line direction exceeds the designated value, it will be judged that the use of the sheet metal support apparatus will be necessary, and, if not, unnecessary (S76).

If it is judged that the sheet metal support apparatus is necessary, on basis of the work size, work weight and metal mold station arrangement, the number of support arms to be used will be set (S78) and the bending follow-up data will be prepared (S100).

If it is judged that there is no need for the sheet metal support apparatus, the support arm number will be set to be zero (S80).

Next, based on the shape data stored in the database, and the bent shape by the bending process, it is judged whether the punch and the work interfere with each other when the punch and die separate after the bending process (S82). If there is no interference, the interference avoidance movement pattern 1 will be set (S86) and procedure will proceed to S96 that will be described later.

If it is judged that interference will occur in S82, it will be judged whether the sheet metal support apparatus is provided with the option device for interference avoidance (S84). If the option is not set up, the interference avoidance movement pattern 2 which will be mentioned later by referring to FIG. 19 will be set up (S88), and the disengagement angle δ will be evaluated (S90) and will proceed to step S96.

If an option is set up in the judgment of S84, the interference avoidance pattern 2 or 3 will be set (S92), the disengagement position S, and the disengagement angle δ will be calculated (S94) and judgment will be made whether the entire bending process is completed or not (S96). If there are bending processes not completed left, transfer will be made to S72. If the entire bending process is completed, procedure is returned.

Figure 17:
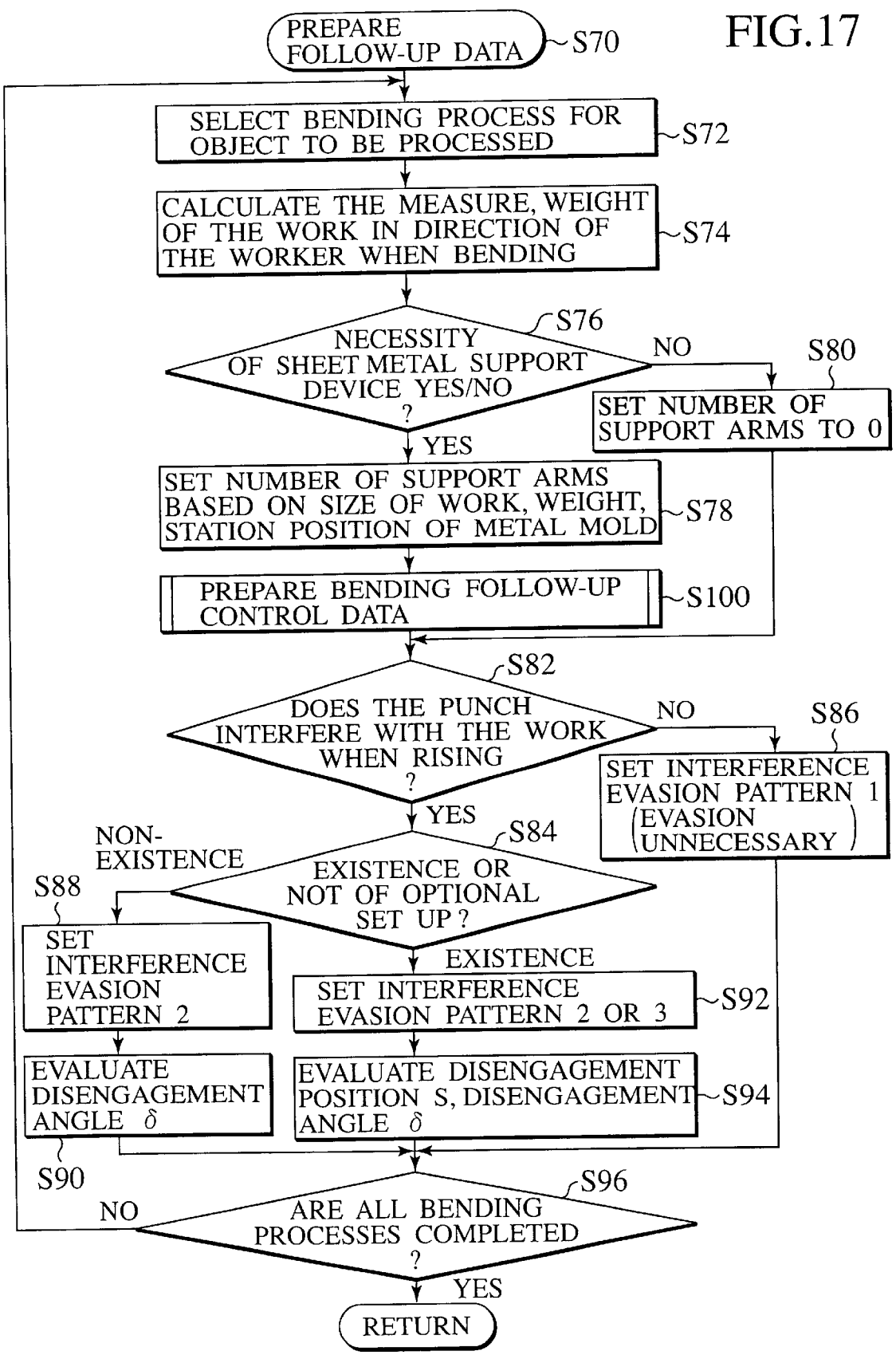
FIG. 17 is a flow chart that describes the method of generating the follow-up data for controlling the action of the sheet metal support apparatus, in FIG. 16.
Figure 18:
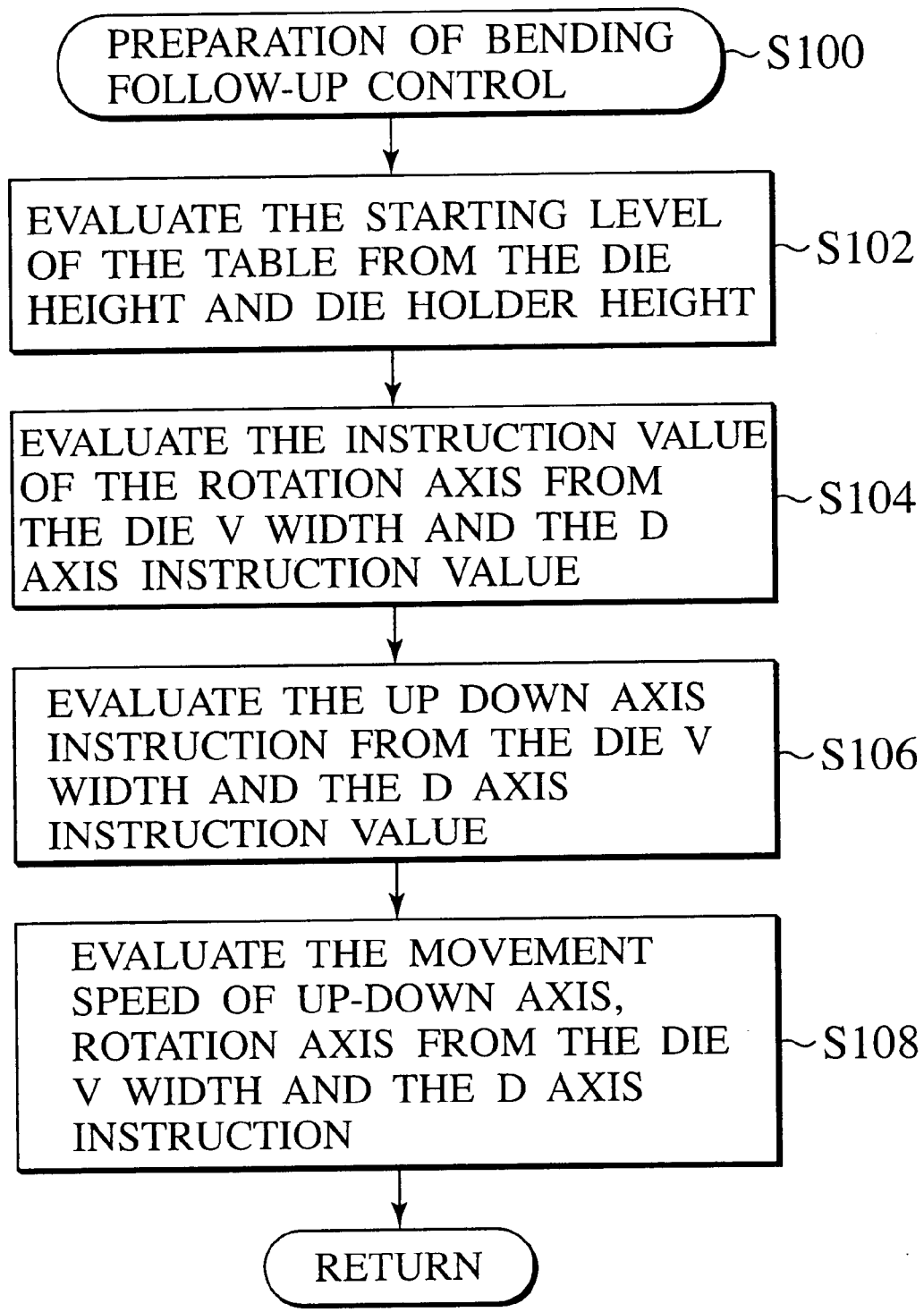
FIG. 18 is a flow chart that explains the method to generate the bending follow-up data for controlling the sheet metal support device, in FIG. 17.

FIG. 18 is a flow chart which explains the details of the bending follow-up control data preparation routine for S100 of FIG. 17, and is a flow chart to prepare the control data to make the support arm follow-up the rise of the work in the bending process designated by the bending order of the sheet metal parts specified by the sheet metal parts ID.

First, by reference to the database of the host machine, the die height is acquired on basis of the die No., the die holder height is acquired on basis of the die holder No. and the value of the die holder height and the die height added to the standard height of the die holder is taken as the follow-up start height H where the support arm of the sheet metal support apparatus starts the follow-up of the rise of the work (S102).

Next by reference to the database, the die V width is acquired, and the D axis order value of the corresponding bending order is acquired, and based on the die width, D axis order value, the rotation axis order value which rotates the support arm, in other words the aimed rotation position of the support arm is calculated (S104). Needless to say, the size and shape of the rotation mechanism of the sheet metal support apparatus 11 will be reflected in the form of the calculation formula.

Next based on the die width, the D axis instruction valve, the up-down axis instruction number by which the support arm is moved up and down, in other words the target height position of the support arm will be calculated (S106). Here, similar to the target rotation position, the measure and form of the rotation mechanism of the sheet metal support apparatus 11 shown in FIG. 1 or FIG. 12 will be reflected on the form of the calculation equation.

Next, based on the die width, the inputted D axis assigned speed, the rotation axis speed, the up-down axis speed which moves the support arm up and down will be calculated (S108) and proceeds to return.

Now there are cases where the calculated target rotation position of the support arm does not coincide with the true target rotation position. This is due to the fact that more precisely, the bending part of the work has a curved surface with a certain curvature, and the curvature (or radius of curvature) of this curved surface differ with the work thickness and material quality and the target rotation position of the arm depends on the radius of curvature.

Therefore after preparing the control data based on FIG. 16, it is preferable to perform a trial bending based on this control data, and to detect potential discrepancies between the work and the support arm at the target rotation position of the work. And in case discrepancies occur between the work and support arm at the target rotation position, in order to compensate this discrepancy it is desirable to calibrate at least either the target position or the target rotation position and store the calibrated value in the database.

Also detection of potential discrepancies between the work and the support arm and the computation and storage of the calibrated value of the height and rotated position may be performed a plurality of times at designated angle intervals or designated time intervals in between the start of the bending process and the target rotation position.

Next, the interference avoidance motion pattern 2 and 3 will be explained with reference to FIG. 19 and FIG. 20.

The interference avoidance movement pattern 2 shown in FIG. 19, is a standard movement of avoiding interference between the punch P and work W when the punch P and die D are separated after the bending process, where at the end of the bending process the work W is made to adhere to the support arm 43, and the interference between the punch P and the work W is avoided by increasing the angle of inclination by increasing the rotation angle of the support arm 43 more.

First as shown in FIG. 19(a) after the bending, the work W is adhered by a work adsorption device 103 such as an electromagnet or a vacuum pad and the like installed on table 101 provided on the upper surface of the support arm 43. Next, as shown in FIG. 19(b), while raising the punch P, the support arm 43 on which the work W is adhered by a raising amount S is raised to the disengagement position which is at a smaller raising amount than the rise of the punch P. By this raising of the punch P and the raising of the support arm, a spacing by which the rotation of the work W does not interfere with punch P and die D will be obtained.

Next, as shown in FIG. 19(c), the support arm 43 is rotated to the disengagement angle position δ that is larger than the bending termination angle Θ. At this state, the punch is raised as shown in FIG. 19(d) and returned to initial position of bending. Finally as shown in FIG. 19(e), the support arm 43 is returned to the follow-up movement starting position. In this way, the punch P and die D may be separated without interference of the punch P and work W.

The interference avoidance movement pattern 3 shown in FIG. 20 is an optional movement for avoiding interference between punch P and work W when the punch P and die D are separated after bending, where the interference of the punch P and work W is avoided by adhering the work W to the support arm 43 when the bending is finished and sliding the table 101 on the upper face of the support arm 43 parallel to the work support surface.

To do so, as shown in FIG. 20(a), the table 101 on the upper face of the support arm 43 is attached so that it may slide on the support arm 43 and also to move the table 101 parallel to the support 43, an air cylinder 105 is provided. Also on the upper face of table 101, a work adsorption device 103 such as an electromagnet or vacuum pad and the like is included.

When the bending process is finished, the work adhesion device 103 adheres the work W as shown in FIG. 20(a). Next, as shown in FIG. 20(b), while raising the punch P, the support arm 43 with the work W adhered is raised to the disengagement position by a rise amount about equal or somewhat smaller than the rise amount of the punch P. By this rise of the punch P and the rise of the support arm 43, a spacing will be given whereby the work W will not interfere with the punch P and D when moving parallel to the table face.

Next, as shown in FIG. 20(c), a cylinder rod 105a is moved forward by sending compressed air through an air tube not shown in the figure to an air cylinder 105. The table 101 that is fixed to the front section of the cylinder rod 105 by a bracket 107 will move parallel to the disengagement position with the work W adhered.

At this stage, the punch will be raised as shown in FIG. 20(d) to bring it back to the initial position of the bending process. Finally, as shown in FIG. 20(e), the support arm 43 is returned to the follow-up movement start position. By this way, the interference between the punch P and work W may be avoided when the punch P and die D is separated.

Next by reference to FIG. 21, the automatic determination of hemming movement that is an example of application of the present invention will be described. Hemming, also called edge bending is to fold up the edge of the sheet to reinforce the thin sheet and to get rid of the sharp edge to prevent injury. A hemming metal mold specific to the hemming is used. The punch of the hemming metal mold has, for example, an acute tip angle of about 30°. As shown in FIG. 21(a), the hemming metal mold has a metal mold part 123 which has a V groove (die height hh1) with a bending angle corresponding to the punch, and a metal mold part 125 (die height hh2) to crush and fold in the tip of the work bent with an acute angle, where the die height hh1, hh2 are stored in database corresponding to the hemming metal mold ID No.

FIG. 21(a) shows the start of the first acute angle bending by the hemming metal mold. Here, in preparing the control data of the height of the support arm 43 of the sheet metal support apparatus, the follow-up start height position is determined automatically based on the die height hh1 against the die standard position in the bending work process which is one of the hemming metal mold data stored in the database.

Next, as shown in FIG. 21(b) the inclination angle control of the support arm 43 during the bending and control of its height is calculated by the method in accordance with the D value of the V width and D axis movement of the die.

Next, when bending is ended, the inclination of the support arm 43 returns to the horizontal position as shown in FIG. 21(c) whereas the position of the height that the support arm 43 returns to is determined as the height hh2 of the die metal mold surface for the folding at the die standard position.

After this, the worker, as shown in FIG. 21(d), pushes the work W placed on the upper surface of the support arm 43, which has been made the same height as the die height hh2, into the fold up die 125 and executes the fold up press.

What is claimed is:

1. A computer readable recording medium which stores control data for controlling the action of a sheet metal bending system provided with a press brake and a sheet metal support device, the control data comprising:
   an ID of a sheet metal part;
   a process number that is related to the ID and specifies the ith bending process of a plurality of bending processes;
   a D value which is related to the process number and specifies a target engagement position of a punch and a die in the ith bending process;
   a L value that is related to the process number and specifies a target position of a back gauge in the ith bending process;
   a V width of the die to be used in the ith bending process, the V width being related to the process number; and
   a target rotation position Θ of the sheet metal support which is related to the process number and corresponds to the D value and the V width of the die in the ith bending process.

2. A method of generating control data to control the action of a sheet metal bending system provided with a press brake and a sheet metal support apparatus, wherein the press brake is provided with a punch and a die which bend along a bending line on the sheet metal by mutually approaching and retreating from each other, the punch and die have a bending axis, the press brake is provided with a back gauge to position the sheet metal so that the bending axis coincides with the bending line, the sheet metal support device supports the sheet metal in front of the press brake, the sheet metal support device is provided with a support arm which rotates around a rotating axis parallel to the bending axis, and the control data is a control data for controlling the approach and retreat movement of the punch and die and at least the rotation of the support arm in a bending process which includes a plurality of bending stages to produce sheet metal parts which possess a plurality of bending lines; and wherein, the method comprises:
   generating an ID of a sheet metal part;
   generating a bending order that is order of bending the plurality of bending lines and generating the punch and die type for bending each bending line;
   generating a D value that prescribes a punch and die target engagement position and generating an L value that prescribes a target position of the back gauge, in each bending process;
   determining a Z direction position of the support arm at the start of the bending in each bending process based on a Z-axis direction size of the die to be used; and
   determining a target Z axis direction position and a target rotation position Θ of the support arm in each bending process based on the corresponding D value and a V width of the die.

3. The method according to claim 2, wherein the sheet metal support is movable in the Z axis direction in which the punch and the die move toward and away from each other.

4. The method of claim 3, wherein the Z-axis direction is the vertical direction.

5. The method of claim 2, further comprising determining a number of sheet metal supports (including zero) in each bending process.

6. The method of claim 5, wherein at least one of the items of work size, flange protrusion length in a front side of a work machine, sheet thickness and quality of material is used to determine the number of sheet metal supports.

7. The method of claim 2, further comprising performing a trial bending of a sheet metal by the bending system based on the determined position data, and when discrepancy occurs in the movement of the sheet metal support and the movement of the work being bent in the bending process, at least one of a target height position and a target rotation position of the sheet metal support are revised are and stored.

8. The method of claim 2, further comprising determining whether, in each bending process, the punch may be separated freely from work at the target engagement position and, if the punch is not separable, determining the movement pattern of at least one of the punch and die and the movement pattern of the sheet metal support to make the punch freely separable from work at the target engagement position.

9. The method of claim 2, wherein the type of the punch and die, the D value the L value, a height position of the sheet metal support at the start of the process, a target height position and a target rotation position are stored in a memory medium together with the ID.

10. A method according to claim 2, wherein the method includes preparing at least one of an unfolded figure and a three dimensional figure of the parts, based on initial CAD data of the parts.

11. A method according to claim 10, wherein the control data is prepared based on at least one of the unfolded figure and the three dimensional figure.

12. A method according to claim 8, where the movement pattern includes a disengagement position S and a disengagement angle δ.

13. A computer readable recording medium which stores control data to control the movement of a sheet metal bending system provided with a press brake and a sheet metal support device, wherein, the press brake is provided with a punch and a die which mutually approach and retreat from each other to bend the sheet metal along a bending line, the press brake is provided with a back gauge to position the sheet metal against the punch and the die, the sheet metal support device supports the sheet metal in front of the press brake, the press brake is provided with a support arm which freely rotates about a rotation axis parallel to a bending axis, and the control data is a control data for controlling the approach and retreat movement of the punch and die and at least the rotation of the support arm in a bending process which includes a plurality of bending stages to produce sheet metal parts which possess a plurality of bending lines, and wherein, the control data stored on the computer readable recording medium comprises:

an ID of a sheet metal part;

a process number that is related to the ID and specifies the ith bending process of a plurality of bending processes;

a D value which is related to the process number and specifies a target engagement position of the punch and die in the ith bending process;

a L value that is related to the process number and specifies a target position of the back gauge in the ith bending process;

a V width of the die that is related to the process number and that is to be used in the ith bending process; and a target rotation position $\Theta$ of the sheet metal support which is related to the process number and corresponds to the D value and die and the V width of the die in the ith bending process.

* * * * *

UNITED STATES PATENT AND TRADEMARK OFFICE
CERTIFICATE OF CORRECTION

PATENT NO. : 6,823,708 B1
DATED : November 30, 2004
INVENTOR(S) : T. Okubo

It is certified that error appears in the above-identified patent and that said Letters Patent is hereby corrected as shown below:

Title page,
Item [57], ABSTRACT,
Line 27, after "process" insert the following:
-- , and related to the process number and the target rotation position of the sheet metal support which corresponds to the D value which specifies the target engagement position of the punch and die and the V width of the die in the ith bending process --.

Column 13,
Line 65, after "is" insert -- the --.

Column 14,
Line 30, delete "are" (second occurrence).
Line 41, after "D value" insert -- , --.
Line 58, after "wherein" delete ",".

Column 16,
Line 8, delete "and die".

Signed and Sealed this

First Day of November, 2005

JON W. DUDAS
*Director of the United States Patent and Trademark Office*